US012202272B2

(12) United States Patent
Yoshida et al.

(10) Patent No.: US 12,202,272 B2
(45) Date of Patent: Jan. 21, 2025

(54) LIQUID DISCHARGE APPARATUS

(71) Applicant: CANON KABUSHIKI KAISHA, Tokyo (JP)

(72) Inventors: Masahito Yoshida, Saitama (JP); Kouhei Tokuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 18/057,689

(22) Filed: Nov. 21, 2022

(65) Prior Publication Data

US 2023/0166524 A1 Jun. 1, 2023

(30) Foreign Application Priority Data

Nov. 26, 2021 (JP) ................................ 2021-192447

(51) Int. Cl.
*B41J 2/175* (2006.01)

(52) U.S. Cl.
CPC ................................ *B41J 2/17596* (2013.01)

(58) Field of Classification Search
CPC ................................................ B41J 2/175
See application file for complete search history.

(56) References Cited

U.S. PATENT DOCUMENTS

2017/0120617 A1* 5/2017 Matsumura ............ B41J 2/1752
2018/0311964 A1* 11/2018 Tanaka ................ B41J 2/17536

FOREIGN PATENT DOCUMENTS

JP 2014079910 A * 5/2014 .......... B41J 2/17506
JP 2016132165 A 7/2016
JP 2018008412 A 1/2018
JP 2019081384 A 5/2019
JP 2020111012 A 7/2020

OTHER PUBLICATIONS

Kimura, Machine TranslationofJP-2014079910-A, 2014 (Year: 2014).*

* cited by examiner

*Primary Examiner* — Scott A Richmond
(74) *Attorney, Agent, or Firm* — Canon U.S.A., Inc., IP Division

(57) ABSTRACT

A liquid discharge apparatus includes a container, a passage, first and second cover portions, and a valve unit. Liquid is injected into the container through an injection portion and supplied from the container through the passage to the liquid discharge head. The first cover portion pivots on a first axis as a center between an open position to allow access to the injection portion and a close position to not allow access to the injection portion. The second cover portion pivots on a second axis intersecting the first axis and as a center between an open position of the second cover portion to expose the first cover portion and a close position of the second cover portion to cover the first cover portion. The valve unit switches to an open state to open the passage when the second cover portion pivots from the open position to the close position.

18 Claims, 21 Drawing Sheets

LIQUID DISCHARGE APPARATUS

BACKGROUND

Field

The present disclosure relates to a liquid discharge apparatus.

Description of the Related Art

There is a liquid discharge apparatus for discharging a liquid that includes a tube through which the liquid is supplied from a tank that stores the liquid to a head that discharges the liquid. There is also known a liquid discharge apparatus that further includes a valve for closing the tube. For example, Japanese Patent Application Laid-Open No. 2014-079910 discusses a structure for blocking circulation of ink by rotating a rotation lever of a choke valve at a side of an ink tank so that a tube is squashed.

The structure discussed in Japanese Patent Application Laid-Open No. 2014-079910 requires a user to manually perform an opening/closing operation on the valve to close the tube. In a case where the user performs the operation erroneously and the tube is not opened at the time of use, the discharge from the head is not conducted. This causes inconvenience for the user.

SUMMARY

The present disclosure is directed to performing an operation of opening a valve appropriately without causing inconvenience for users.

According to an aspect of the present disclosure, a liquid discharge apparatus includes a container including an injection portion through which a liquid is to be injected, wherein the container is configured to store the liquid to be supplied to a liquid discharge head configured to discharge the liquid, a passage through which the liquid is to be supplied from the container to the liquid discharge head, a first cover portion configured to pivot on a first axis as a center between an open position of the first cover portion to allow access to the injection portion and a close position of the first cover portion to not allow access to the injection portion, a second cover portion configured to pivot on a second axis intersecting the first axis and as a center between an open position of the second cover portion to expose the first cover portion and a close position of the second cover portion to cover the first cover portion, and a valve unit configured to switch to an open state to open the passage in a case where the second cover portion pivots from the open position to the close position.

Further features of the present disclosure will become apparent from the following description of exemplary embodiments with reference to the attached drawings.

DESCRIPTION OF THE EMBODIMENTS

Figure 1:
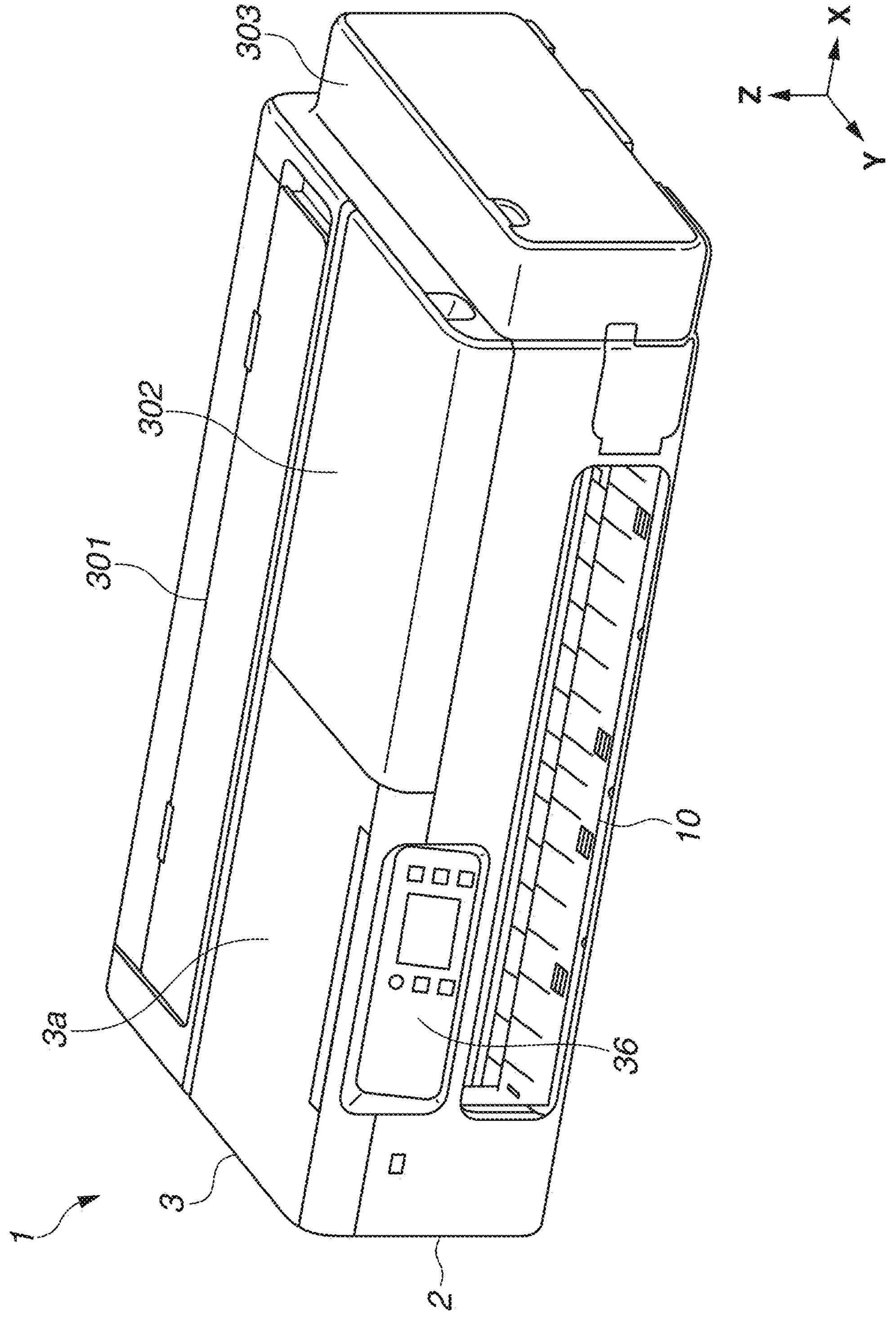
FIG. 1 is an external perspective view illustrating a liquid discharge apparatus according to a first exemplary embodiment.

A first exemplary embodiment will be described in detail below with reference to the attached drawings. In the attached drawings, the same or similar components are given the same reference numeral, and redundant descriptions thereof are omitted.

Summary of Liquid Discharge Apparatus

FIG. 1 is an external front view illustrating a liquid discharge apparatus 1 according to an exemplary embodiment of the present disclosure. While the liquid discharge apparatus 1 according to the present exemplary embodiment is an inkjet recording apparatus that discharges an ink as a liquid and performs recording on recording media, the present disclosure is also applicable to various liquid discharge apparatuses other than inkjet recording apparatuses. In FIG. 1, arrows X and Y indicate horizontal directions that are perpendicular to each other, and an arrow Z indicates a vertical direction (gravity direction). The X-direction corresponds to a width direction (right-and-left direction) of the liquid discharge apparatus 1. The Y-direction corresponds to a depth direction of the liquid discharge apparatus 1.

The term "recording" refers to not only cases of forming information with a meaning, such as a character or a drawing, but also cases of forming information with or without a meaning, such as an image, a design, or a pattern on a recording medium, or cases of processing a medium. Whether the recording is manifest so that a person can visually recognize it is irrelevant. Further, while the term "recording medium" is intended to refer to a sheet of paper in the present exemplary embodiment, a cloth, a plastic, or a film can be used.

The liquid discharge apparatus 1 has a flat cuboid shape as a whole, and includes an apparatus body 2 and a body cover portion 3 with a plurality of covers. The body cover portion 3 is provided to cover the apparatus body 2 and forms a top portion of the liquid discharge apparatus 1. The body cover portion 3 according to the present exemplary embodiment includes a sheet feeding cover 301, an access cover 302, and a tank access cover 303 (second cover portion). The sheet feeding cover 301 is used in setting a recording medium. The access cover 302 is used in performing a maintenance operation on an internal portion of the liquid discharge apparatus 1. The tank access cover 303 covers a portion for supplying an ink to a tank of the liquid discharge apparatus 1. Further, a reading unit (scanner unit) 3*a* is provided to read document images, and the entire reading unit 3*a* can be opened and closed similarly to the access cover 302 so that the maintenance operation on the internal portion of the liquid discharge apparatus 1 can be performed. A sheet discharge portion 10 is formed at a front portion of the liquid discharge apparatus 1, and recorded recording media are discharged to the sheet discharge portion 10. At the front portion of the liquid discharge apparatus 1, there is also provided an operational unit 36 for receiving operations by an operator. The operational unit 36 includes a display unit in the form of a touch panel. The operational unit 36 receives input operations from the operator and displays information to the operator.

Figure 2:
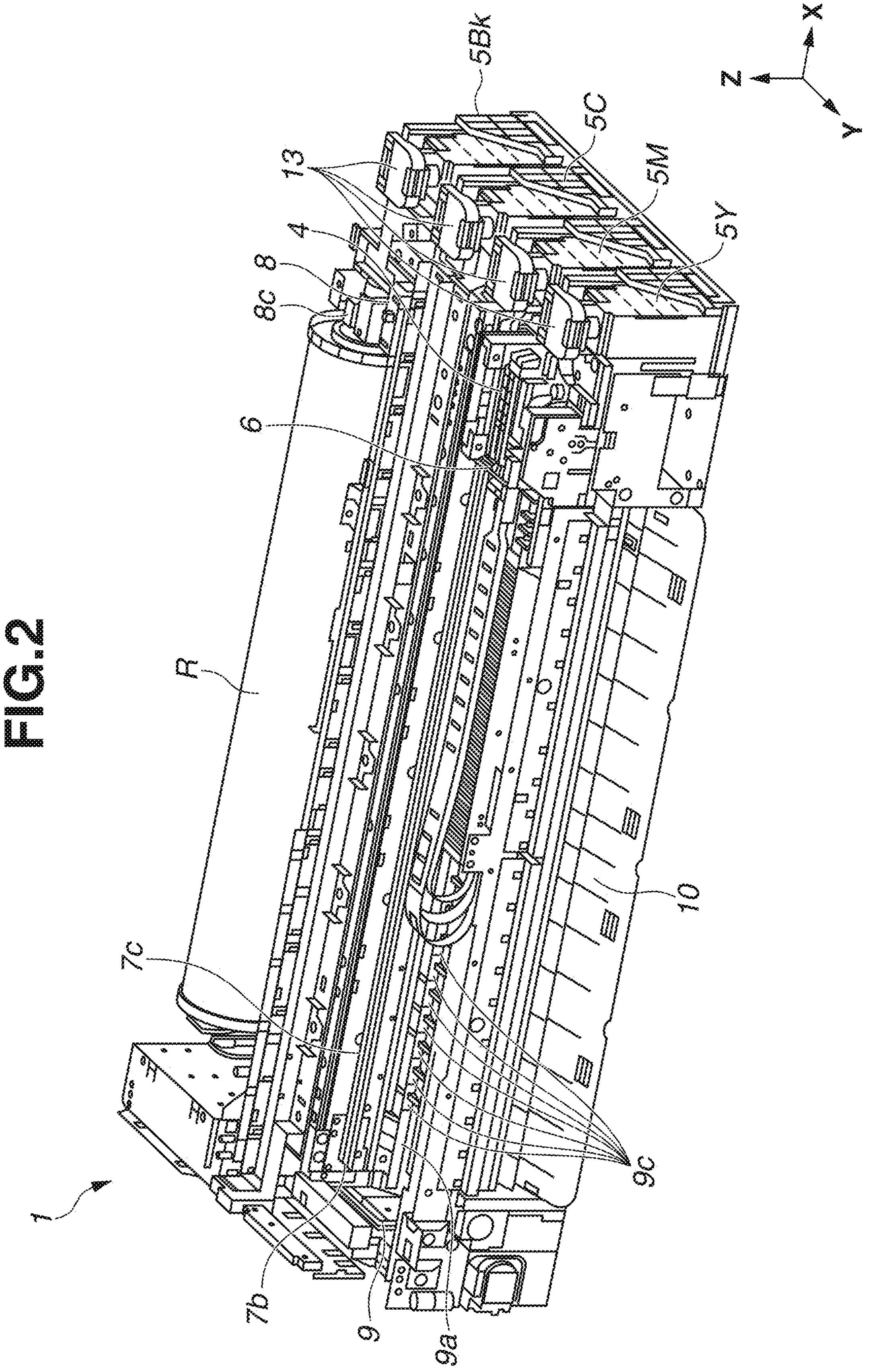
FIG. 2 is a perspective view illustrating an internal mechanism of the liquid discharge apparatus according to the first exemplary embodiment.

FIG. 2 is a diagram illustrating an internal mechanism of the liquid discharge apparatus 1. The liquid discharge apparatus 1 includes a discharge head 4. The discharge head 4 is a liquid discharge head that discharges a liquid. The discharge head 4 according to the present exemplary embodiment is a recording head that performs recording by discharging an ink supplied from a container 5 to a recording medium. The discharge head 4 includes a discharge surface 4*a* (refer to FIGS. 3A and 3B), and a plurality of nozzles for discharging inks is formed on the discharge surface 4*a*. Each nozzle includes, for example, an electrothermal conversion element (heater). Electricity is supplied to electrothermal conversion elements to heat the electrothermal conversion elements so that the inks are bubbled, and the bubble generating energy discharges the inks.

The discharge head 4 is on a carriage 6. The carriage 6 is moved forward and backward in the X-direction (main scanning direction) by a driving unit (not illustrated). The driving unit includes a driving pulley (not illustrated), a driven pulley 7*b*, an endless belt 7*c*, and a carriage motor (not illustrated). The driving pulley and the driven pulley 7*b* are separately arranged in the X-direction. The endless belt 7*c* is wound around the driving pulley and the driven pulley 7*b*. The carriage motor is a driving source that rotates the driving pulley. The carriage 6 is coupled to the endless belt 7*c*, and as the endless belt 7*c* is moved, the carriage 6 moves in the X-direction. While the carriage 6 is moving, the discharge head 4 discharges the inks to a recording medium to record an image. This operation is sometimes referred to as "recording scan".

As described above, the liquid discharge apparatus 1 according to the present exemplary embodiment is a serial-type inkjet recording apparatus with the discharge head 4 mounted on the carriage 6 configured to move forward and backward. The present disclosure is also applicable to other recording apparatuses such as an inkjet recording apparatus with what is called a full-line discharge head (recording head) including a plurality of nozzles that discharges a liquid to a region corresponding to the width of a recording medium.

The liquid discharge apparatus 1 includes a feeding unit 8 and a conveying unit 9. The feeding unit 8 and the conveying unit 9 convey a recording medium.

The feeding unit 8 includes a roll setting portion 8*c* and a recording medium feeding mechanism (not illustrated). The roll setting portion 8*c* feeds a banner-shaped continuous recording medium R from a roll. The feeding mechanism includes a feeding roller (not illustrated) and a feeding motor 8*b* (refer to FIG. 4). The feeding motor 8*b* is a driving source that rotates the feeding roller.

Figure 4:
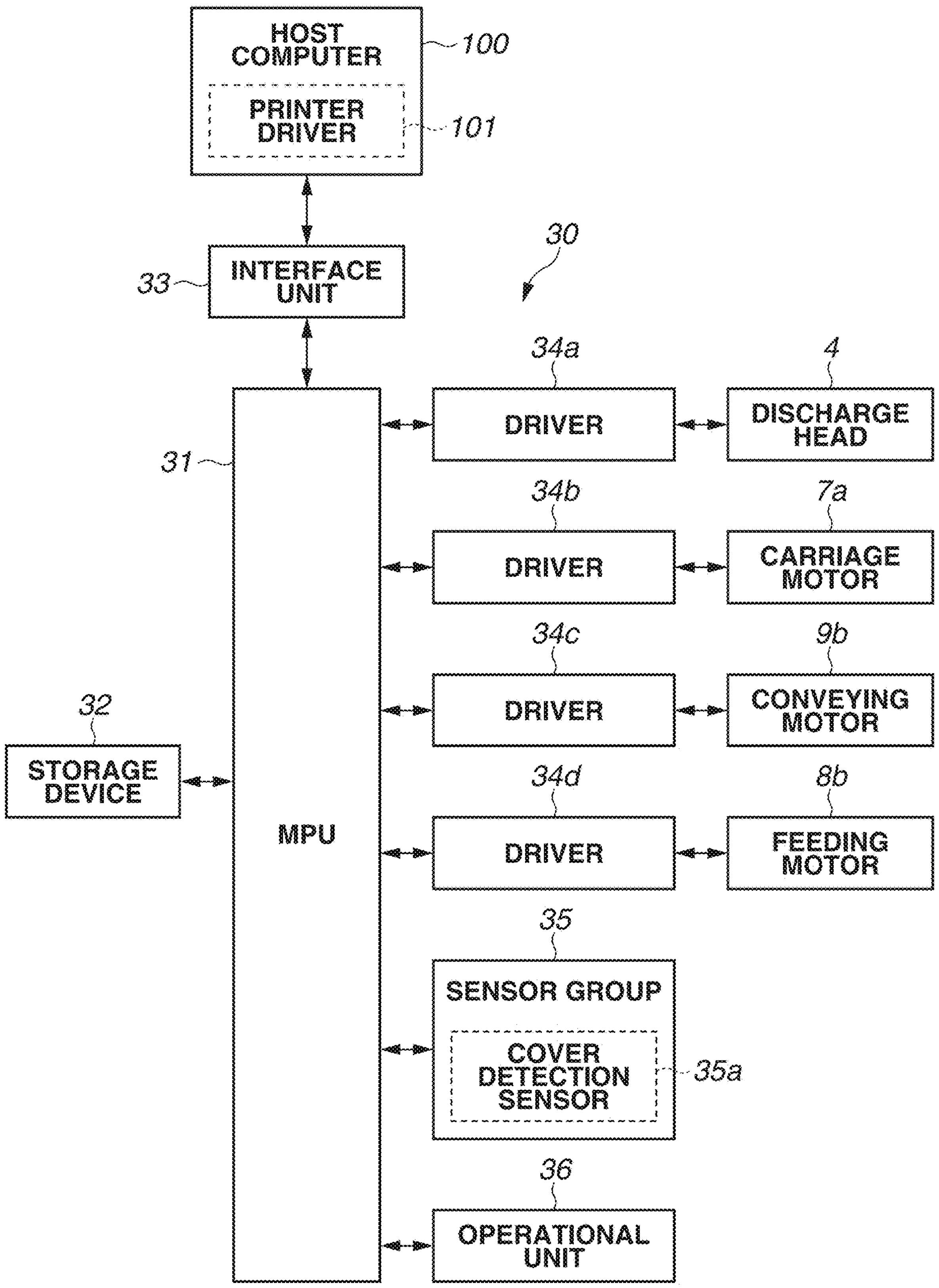
FIG. 4 is a block diagram illustrating a control unit of the liquid discharge apparatus according to the first exemplary embodiment.

The conveying unit 9 is a mechanism for conveying a recording medium fed from the feeding unit 8 in the Y-direction (sub-scanning direction). The conveying unit 9 includes a conveying roller 9*a* and a conveying motor 9*b* (FIG. 4). The conveying motor 9*b* is a driving source that rotates the conveying roller 9*a*. Pinch rollers 9*c* are pressed against the conveying roller 9*a*, and a recording medium is pinched at a nip portion between the pinch rollers 9*c* and the conveying roller 9*a*. The conveying roller 9*a* is rotated to convey the recording medium intermittently to the discharge head 4. The liquid discharge apparatus 1 performs recording operation by alternately performing an operation of conveying a recording medium by the conveying unit 9 and the recording scan. Alternatively, the conveying unit 9 can convey sheet-shaped recording mediums (e.g., cut paper) sheet by sheet to the discharge head 4.

In the present exemplary embodiment, the container 5 is a stationary container fixed to the liquid discharge apparatus 1. In a case where an ink remaining amount becomes low, the operator replenishes the container 5 with ink without removing the container 5 from the liquid discharge apparatus 1.

Containers 5C, 5M, 5Y, and 5Bk are containers that have the same structure and are provided to store inks of different colors from each other. The containers 5C, 5M, 5Y, and 5Bk are aligned in the Y-direction along a right side surface at the front portion of the liquid discharge apparatus 1. Top portions of the containers 5C, 5M, 5Y, and 5Bk are covered with a shared tank cover portion 13 (first cover portion).

Container Structure

Figure 3A:
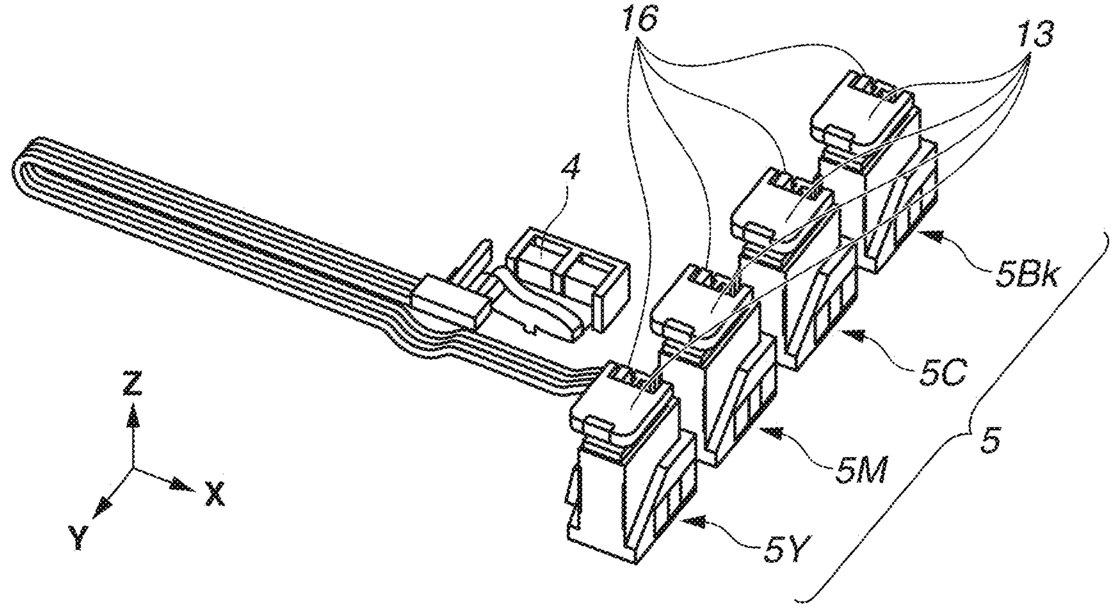
FIG. 3A is a perspective view illustrating a structure of a container and its nearby portion according to the first exemplary embodiment.

FIG. 3A is a perspective view illustrating a structure of a portion including the container 5 and the discharge head 4. In the present exemplary embodiment, the containers 5Y, 5M, 5C, and 5Bk are provided as the container 5, and the container 5 is connected to the discharge head 4 by a supply tube 14.

Figure 3B:
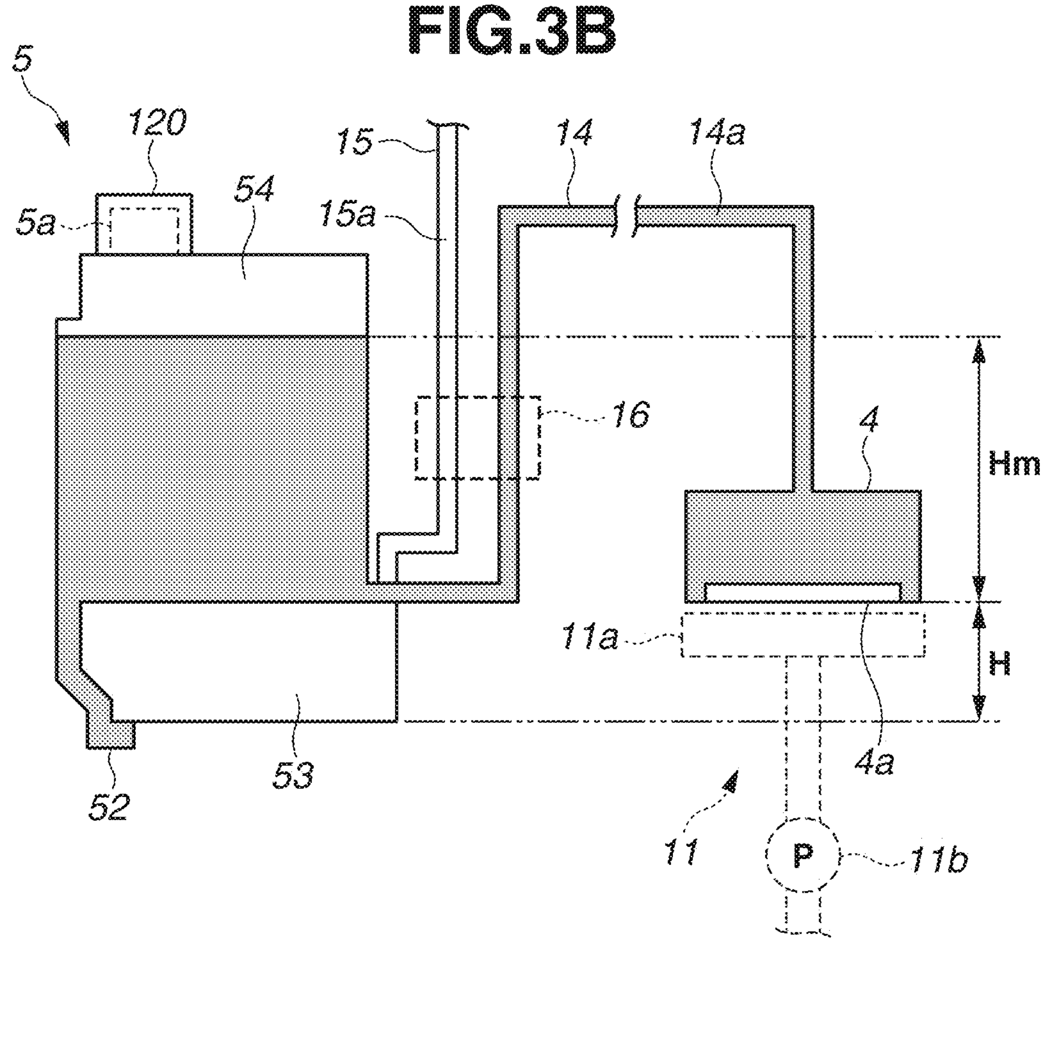
FIG. 3B is a schematic view illustrating a structure of the container and the nearby portion according to the first exemplary embodiment.

FIG. 3B schematically illustrates a structure of the container 5 and a nearby portion thereof. The containers 5Y, 5M, 5C, and 5Bk basically have the structure illustrated in FIG. 3B, with some differences in position where an ink flow passage is connected and in length of the supply tube 14. The container 5 includes a storage portion 54, a liquid-gas exchange portion 52, and a buffer room 53. The storage portion 54 stores ink. The buffer room 53 can store ink that is extruded in a case where the air in the storage portion 54 expands due to a change in atmospheric pressure or temperature. An injection portion 5*a* through which a liquid for replenishment (ink for replenishment) is supplied is provided at a top portion of the container 5. The injection portion 5*a* is closed with a cap portion 120. In replenishing the container 5 with ink, the operator removes the cap portion 120 from the injection portion 5*a* and performs an ink replenishment operation in a state where the injection portion 5*a* is in an opened state. The cap portion 120 is provided to each container 5.

Passages 14*a* and 15*a* communicate in the container 5. The passage 14*a* is connected to the storage portion 54, is a liquid supply passage (ink supply passage) that supplies the ink from the container 5 to the discharge head 4, and is formed by the supply tube 14. The supply tube 14 is a flexible tube. The passage 15*a* is connected to the buffer room 53, is an air communication passage that connects the inside of the container 5 to atmospheric air, and is formed by an air communication tube 15. The air communication tube 15 is a flexible tube. A valve 16 opens and closes the passages 14*a* and 15*a*. In the present exemplary embodiment, each of the containers 5C, 5M, 5Y, and 5Bk is provided with the dedicated valve 16.

The liquid-gas exchange portion 52 is provided at a position lower by a height H than the discharge surface 4*a* of the discharge head 4. Specifically, a negative pressure by a hydraulic head difference corresponding to the height H is applied to the discharge surface 4*a*. This prevents a leakage of the ink from the discharge surface 4*a*. Further, the buffer room 53 is positioned at a lower portion of the container 5. This prevents a leakage of the ink from the air communication passage 15*a*.

During the recording operation, both the ink supply passage 14*a* and the air communication passage 15*a* are kept open to supply the ink to the discharge head 4. On the contrary, both the ink supply passage 14*a* and the air communication passage 15*a* are closed during the replenishment of the container 5 with ink. During the injection of the ink for replenishment, the liquid surface of the ink in the container 5 may become higher than the height of the discharge surface 4*a* of the discharge head 4. In this case, if the ink supply passage 14*a* is open, a pressure by a hydraulic head difference corresponding to a height Hm is applied to the discharge surface 4*a*, and this may cause a leakage of the ink from the discharge surface 4*a*.

A design for preventing the liquid surface of the ink in the container 5 from becoming higher than the height of the discharge surface 4*a* of the discharge head 4 can be employed. The design, however, can impose restrictions on the ink storage capacity of the container 5 and the degree of freedom in design of the liquid discharge apparatus 1 in the Z-direction. Further, if the air communication passage 15*a* is not closed, the injected ink may flow into the buffer room 53. In this case, the buffer room 53 may not be able to properly perform the role of storing the ink that is extruded from the storage portion 54 due to a change in atmospheric pressure or temperature.

From the foregoing points, it is necessary to prevent erroneous opening and closing of the passages 14*a* and 15*a* by the valve 16.

In the present exemplary embodiment, the valve 16 is opened and closed along with the movement of the tank access cover 303 and the tank cover portion 13. Specifically, the tank access cover 303 and the tank cover portion 13 have a function as an operational unit for use by the operator to operate a mechanism for opening and closing the valve 16. This enables the valve 16 to be opened and closed by manual operations by the operator without using a sensor or an actuator.

A recovery unit 11 is a mechanism for maintaining ink discharge performance of the discharge head 4 and is disposed at an end of a range of movement of the carriage 6. The recovery unit 11 includes a cap 11*a* and a pump 11*b*. The cap 11*a* covers the discharge surface 4*a* of the discharge head 4. The pump 11*b* suctions the ink from the discharge head 4 via the cap 11*a*. The cap 11*a* can be moved by a mechanism (not illustrated) between a position to cover the discharge surface 4*a* and a position separated from the discharge surface 4*a*. The cap 11*a* covers (caps) the discharge surface 4*a* to prevent the discharge surface 4*a* from becoming dry. Further, the pump 11*b* is operated in a state where the discharge surface 4*a* is capped with the cap 11*a*, whereby thickened ink attached to the discharge head 4 can be removed and the passage 14*a* and the discharge head 4 can be filled with ink. During a recording operation performed in a state where the passage 14*a* and the discharge head 4 are filled with ink, the container 5 supplies ink in an amount corresponding to an amount of ink decreased (discharged) from the discharge head 4.

Control Unit

FIG. 4 is a block diagram illustrating a control unit 30 of the liquid discharge apparatus 1. A micro-processing unit (MPU) 31 is a processor that controls operations of the liquid discharge apparatus 1 and data processing. The MPU 31 executes a program stored in a storage device 32 and controls the entire liquid discharge apparatus 1.

The storage device 32 includes, for example, a read-only memory (ROM) and a random access memory (RAM). The storage device 32 stores the program to be executed by the MPU 31 and various types of data for use in processing, such as data received from a host computer 100.

The MPU 31 controls the discharge head 4 via a driver 34*a*. The MPU 31 controls a carriage motor 7*a* via a driver 34*b*. Further, the MPU 31 controls the conveying motor 9*b* via a driver 34*c* and controls a feeding motor 8*b* via a driver 34*d*.

The MPU 31 obtains detection results from a sensor group 35 of various sensors of the liquid discharge apparatus 1 and performs control operations. The sensor group 35 includes a cover detection sensor 35*a*. Further, the MPU 31 controls display on a display unit of the operational unit 36 and receives operations by the operator on the operational unit 36.

The host computer 100 is, for example, a personal computer or a mobile terminal (e.g., a smartphone, a tablet terminal) that the operator uses. A printer driver 101 for performing communication between the host computer 100 and the liquid discharge apparatus 1 is installed in the host computer 100. The liquid discharge apparatus 1 includes an interface unit 33, and the host computer 100 and the MPU 31 communicate with each other via the interface unit 33. In a case where, for example, an instruction to perform a recording operation is input to the host computer 100 by the operator, the printer driver 101 gathers recording target image data and recording-related settings (such as recorded image quality information) and instructs the liquid discharge apparatus 1 to perform the recording operation.

Operations in Liquid Replenishment

A process of replenishing the container 5 with ink will be described below with reference to FIGS. 5A, 5B, 6A, and 6B. To replenish the container 5 with ink, the injection portion 5*a* of the container 5 is to be exposed. The liquid discharge apparatus 1 according to the present exemplary embodiment is configured so that the tank access cover 303 can move between a close position (position in FIG. 1) and an open position by a manual operation by the operator. The tank access cover 303 at the close position covers the inside of the apparatus body 2, whereas the tank access cover 303 at the open position exposes the inside of the apparatus body 2. FIG. 5A illustrates a state where the tank access cover 303 is moved to the open position. According to the present exemplary embodiment, the apparatus body 2 supports the tank access cover 303 so that the tank access cover 303 can freely swing between the open position and the close position. A swing center 3*b* of the tank access cover 303 is set in parallel to the Y-direction and in a right side surface portion of the apparatus body 2.

As the tank access cover 303 is moved to the open position, the tank cover portion 13 covered with the tank access cover 303 at the close position is exposed and changes to a state where the tank cover portion 13 can be opened and closed. The liquid discharge apparatus 1 according to the present exemplary embodiment is configured so that each tank cover portion 13 can be moved between a close position (position in FIG. 5A) and an open position (position in FIG. 5B) by manual operations by the operator. The tank cover portion 13 at the close position covers the top portion of the container 5, whereas the tank cover portion 13 at the open position exposes the top portion of the container 5.

Figure 5B:
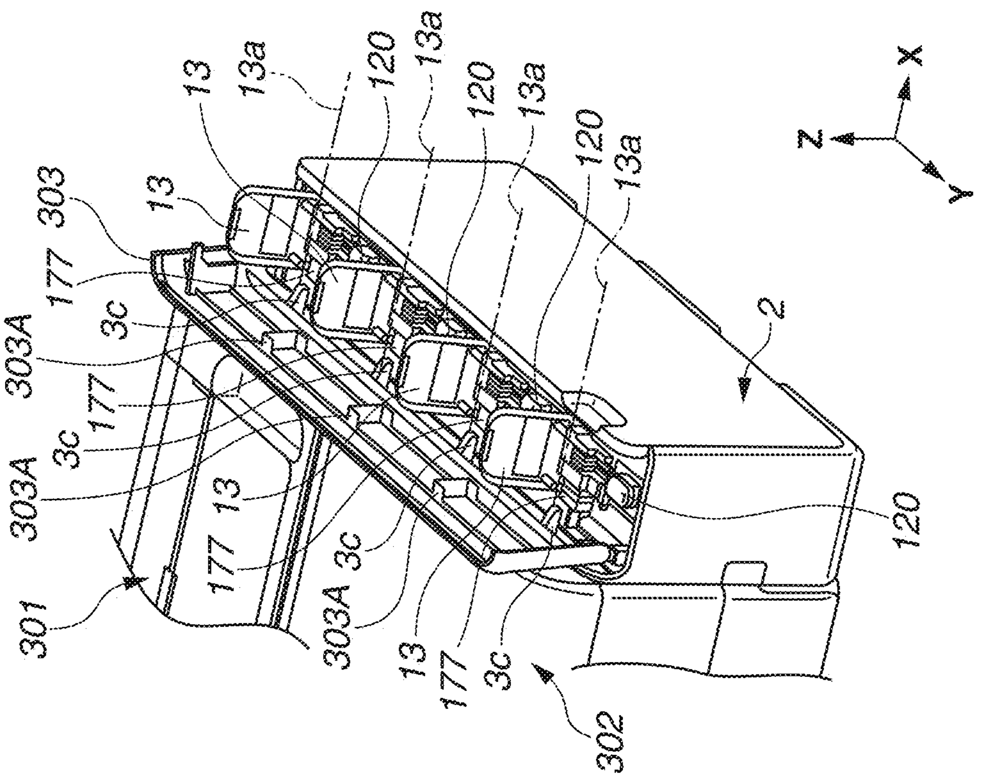
FIGS. 5A and 5B are perspective views illustrating a preparation procedure for replenishing the liquid discharge apparatus with ink according to the first exemplary embodiment.
Figure 5A:
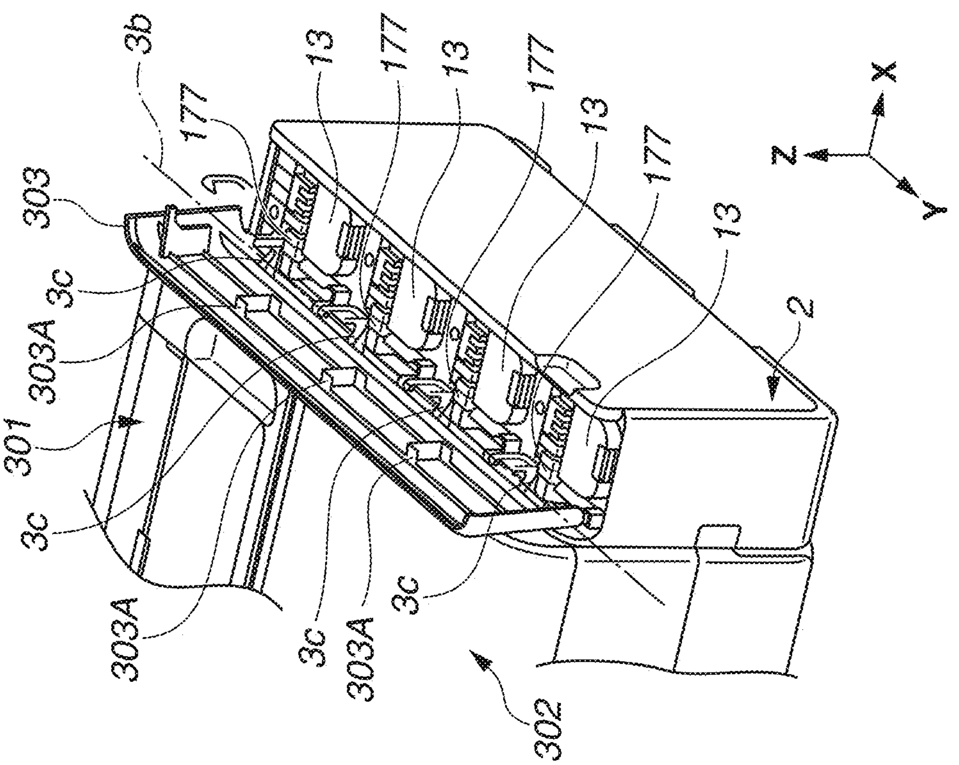

FIG. 5B illustrates a state where the tank cover portion 13 is moved to the open position. In the present exemplary embodiment, the apparatus body 2 supports the tank cover portion 13 so that the tank cover portion 13 can freely swing between the open position and the close position. A swing center 13*a* of the tank cover portion 13 is set in parallel to the X-direction and in an end portion of the tank cover portion 13. The tank cover portion 13 is moved to the open position to allow access to the cap portion 120 covering the injection portion 5*a* of the container 5 that corresponds to the tank cover portion 13. Specifically, the tank cover portion 13 is moved to the open position to expose the cap portion 120.

Figure 6A:
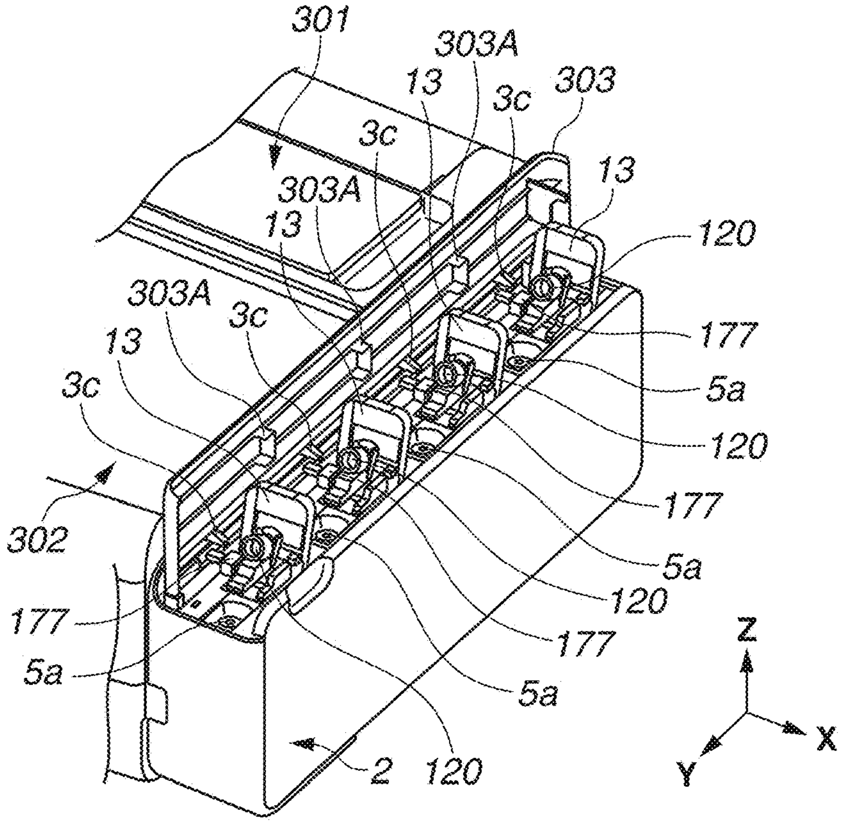
FIG. 6A is a perspective view illustrating a preparation procedure for replenishing the liquid discharge apparatus with ink according to the first exemplary embodiment.
Figure 6B:
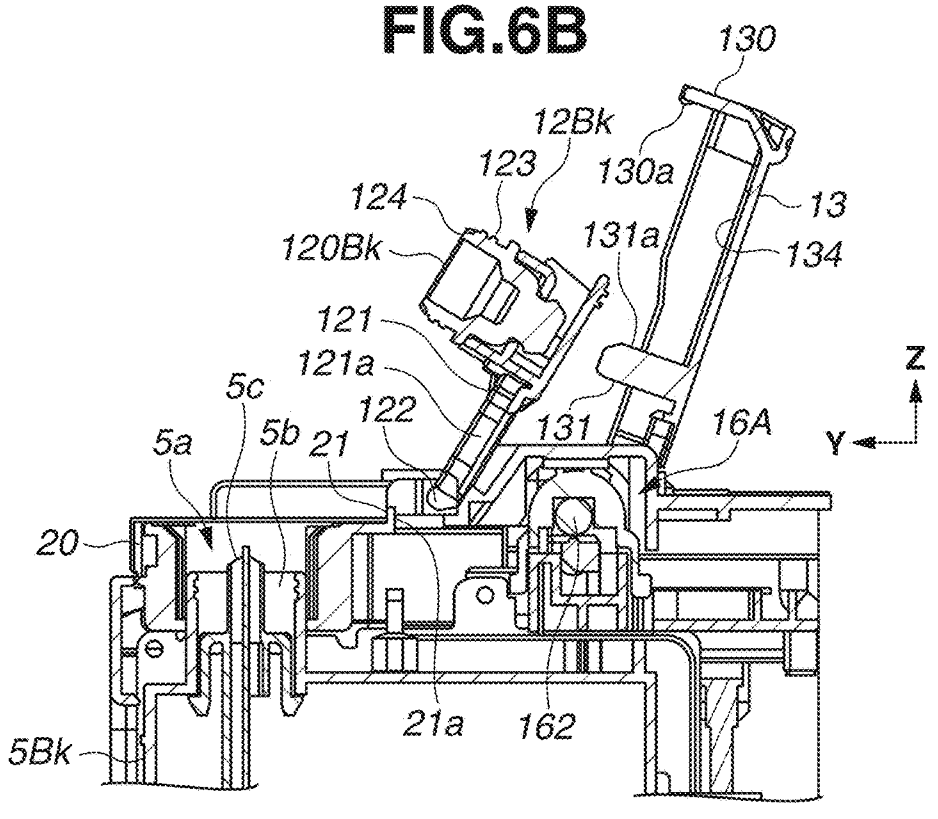
FIG. 6B is a cross-sectional view illustrating an open form of an injection portion according to the first exemplary embodiment.

Then, the cap portion 120 is removed from the container 5 that is to be replenished with ink, whereby the injection portion 5*a* of the container 5 is exposed to be ready for ink replenishment. FIG. 6A illustrates a state where the cap portion 120 is removed from the injection portion 5*a* of each of the containers 5. Further, FIG. 6B illustrates a state where the tank cover portion 13 of the container 5Bk in particular is at the open position and a cap portion 120Bk is removed. In this state, the operator can replenish the container 5Bk with ink from the injection portion 5*a*. After the replenishment, the injection portion 5*a* is capped with the cap portion 120Bk, the tank cover portion 13 is moved to the close position, and the tank access cover 303 is moved to the close position. Consequently, the ink replenishment operation is completed, and the liquid discharge apparatus 1 becomes ready to perform recording.

Structures of Cap Member and Cover Portion

Figure 7A:
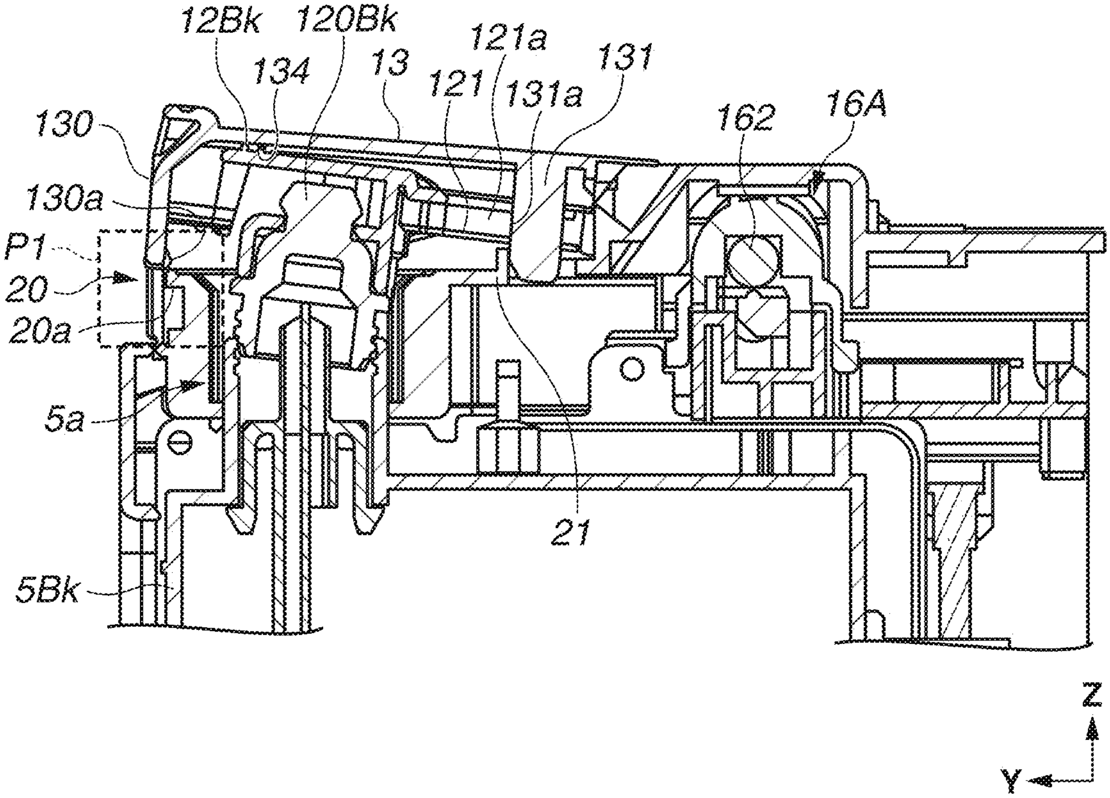
FIG. 7A is a cross-sectional view illustrating a state during an operation of moving a cap member and a cover portion to a close position according to the first exemplary embodiment.
Figure 7B:
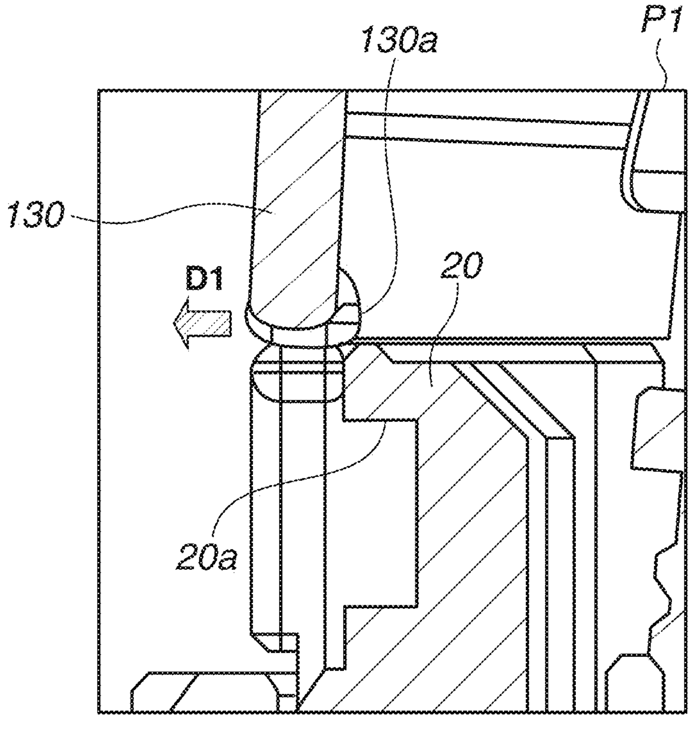
FIG. 7B is an enlarged view illustrating a portion in FIG. 7A according to the first exemplary embodiment.
Figure 8A:
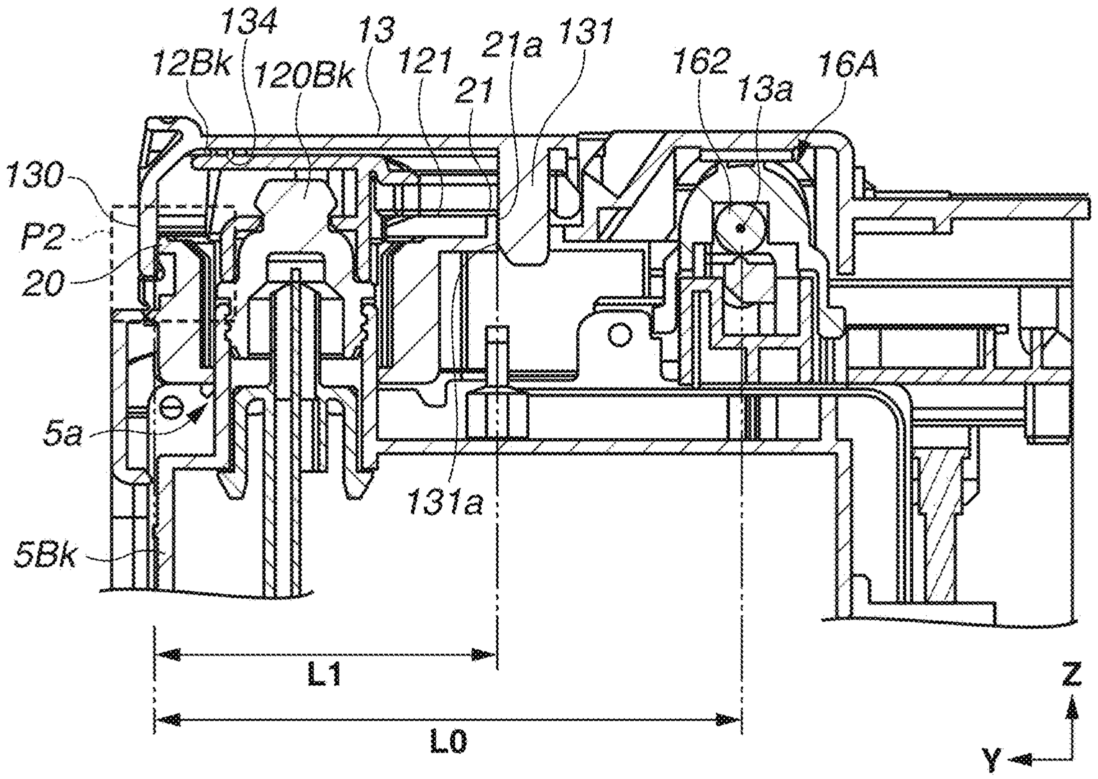
FIG. 8A is a cross-sectional view illustrating a state of the cap member and the cover portion at the close position.
Figure 8B:
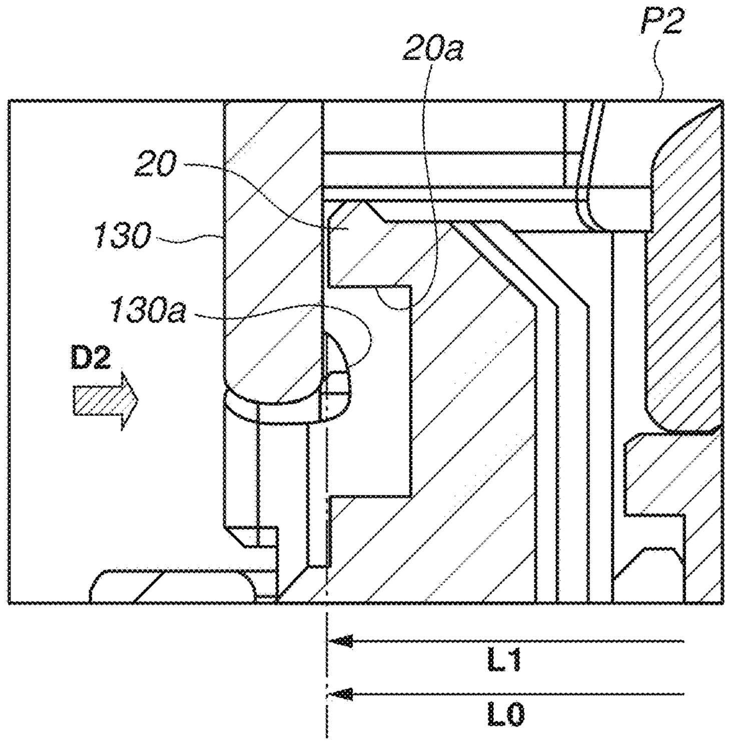
FIG. 8B is an enlarged view illustrating a portion in FIG. 8A according to the first exemplary embodiment.
Figure 9B:
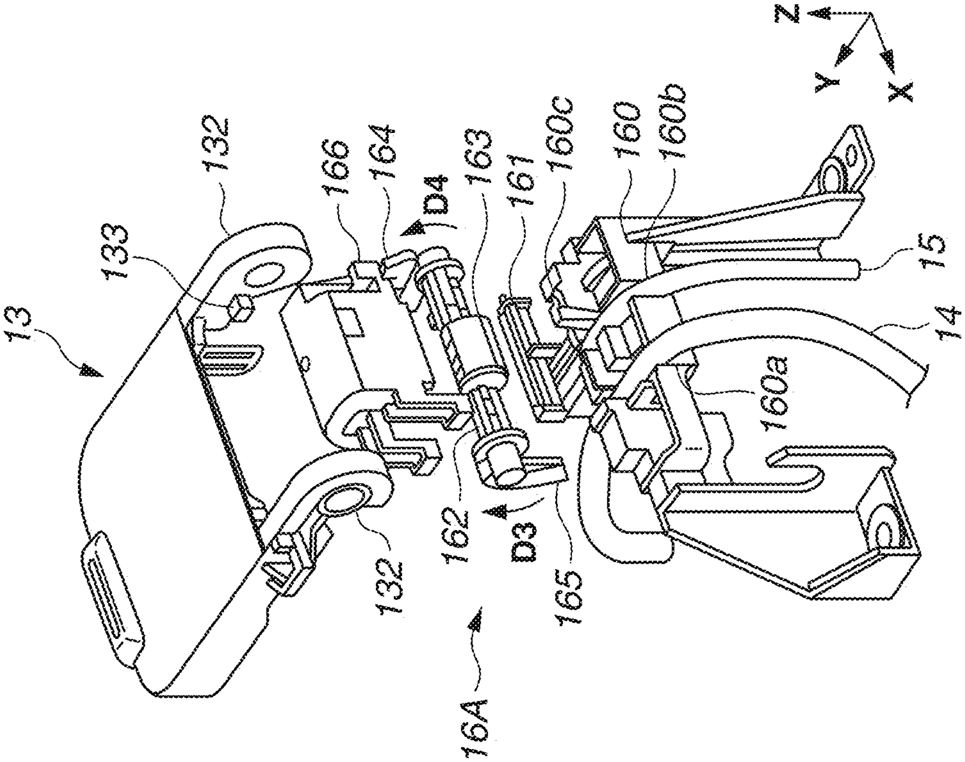
FIGS. 9A and 9B are perspective views illustrating the cover portion and a valve according to the first exemplary embodiment.
Figure 9A:
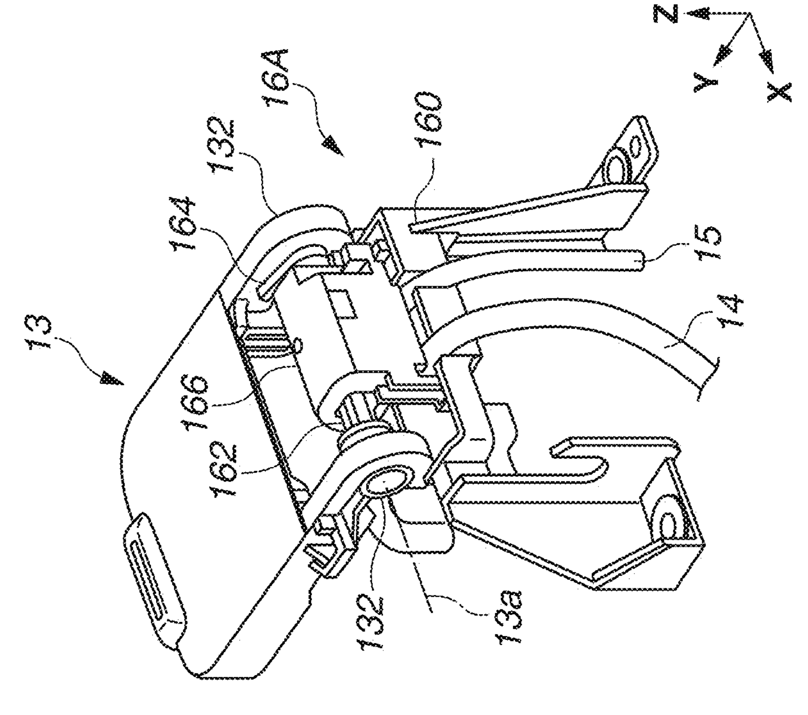

Each cap portion 120 is provided with a cap member 12. A structure of the cap member 12 and a structure of the tank cover portion 13 will be described below with reference to FIGS. 7A, 7B, 8A, 8B, 9A, and 9B. FIG. 7A is a view illustrating a state during an operation of moving a cap member 12Bk and the tank cover portion 13 to the close position. FIG. 7B is an enlarged view illustrating a portion P1 in FIG. 7A. FIG. 8A is a view illustrating a state of the cap member 12Bk and the tank cover portion 13 at the close position. FIG. 8B is an enlarged view illustrating a portion P2 in FIG. 8A. FIGS. 9A and 9B are views illustrating the tank cover portion 13 and the valve 16.

While mainly structures of the cap member 12Bk, the tank cover portion 13, and the cap portion 120 in relation to the container 5Bk will be described below, cap members 12C to 12Y and tank cover portions 13 for the respective containers 5C to 5Y have similar structures.

First, the cap member 12Bk will be described below. The cap member 12Bk includes an arm portion 121. The cap portion 120Bk is replaceably supported at an end portion of the arm portion 121, and a shaft portion 122 is formed at the other end portion of the arm portion 121. The arm portion 121 branches at a middle portion of the arm portion 121 in a lengthwise direction toward the other end portion to form a space 121*a* therebetween. The apparatus body 2 supports the cap member 12Bk so that the cap member 12Bk can freely swing on the shaft portion 122, and a swing center of the cap member 12Bk is parallel to the X-direction.

The cap portion 120Bk is a tubular member having an open distal end and a closed proximal end, and a seal portion 123 is formed at an intermediate portion in an axial direction of the cap portion 120Bk. A distal end portion 124 of the seal portion 123 defines a circular opening. The injection portion 5*a* includes a cylindrical injection hole 5*b* and a tube portion 5*c* provided to stand at a center of the injection hole 5*b*. A bottle for ink replenishment is inserted in the injection hole 5*b*, and ink in the bottle is injected into the container 5Bk through the tube portion 5*c*. The distal end portion 124 is at a position closer to the distal end of the cap portion 120Bk than the seal portion 123 is in the direction of insertion into the injection hole 5*b*.

The cap portion 120Bk is movable between the open position illustrated in FIG. 6B and the close position illustrated in FIG. 8A. The cap portion 120Bk at the close position is inserted in the injection hole 5*b* to close the injection portion 5*a*. The cap portion 120Bk at the open position is separated from the injection hole 5*b* to open the injection portion 5*a*.

The cap member 12Bk at the close position can be manually moved to the open position by the operator pulling the cap member 12Bk upward. Further, the cap member 12Bk at the open position can be manually moved to the close position by the operator pushing the cap member 12Bk downward.

In the present exemplary embodiment, the cap member 12Bk is disposed within a swing space of the tank cover portion 13, and the swing center of the cap member 12Bk is at a position between the swing center 13*a* and the injection portion 5*a* in the Y-direction. Thus, in a case where the tank cover portion 13 is at the close position, the cap member 12Bk is covered with the tank cover portion 13. Thus, unless the tank cover portion 13 is moved to the open position, the cap member 12Bk cannot be moved to the open position. Covering the cap member 12Bk with the tank cover portion 13 prevents a situation where the cap member 12Bk is unintentionally moved to the open position and the injection portion 5*a* is opened to cause a leakage of the ink from the injection portion 5*a*.

While the cap member 12Bk can be moved singly from the open position to the close position, the cap member 12Bk can also be moved from the open position to the close position by moving the tank cover portion 13 from the open position to the close position. A press portion 134 forms an inner wall surface of the tank cover portion 13 and comes into contact with the cap member 12Bk in moving from the open position to the close position. As illustrated in FIG. 7A, while the tank cover portion 13 is moved from the open position to the close position, the press portion 134 comes into contact with the cap member 12Bk and moves the cap member 12Bk to the close position. By moving the tank cover portion 13 to the close position after replenishing with ink, the operator can simultaneously move the cap member 12Bk to the close position to close the injection portion 5*a*. Further, the structure can prevent a situation where the operator forgets to move the cap member 12Bk to the close position (the operator forgets to close the injection portion 5*a*).

Next, the tank cover portion 13 will be described below. The tank cover portion 13 includes an engagement portion 130 at one end portion and a pair of bearing portions 132 at the other end portion. A shaft portion of a cam member 162 of the valve 16, which will be described below, is inserted in the bearing portions 132, and the tank cover portion 13 is supported so that the tank cover portion 13 can freely swing on the shaft portion. The engagement portion 130 is engaged with an engagement portion 20 of the apparatus body 2. The engagement portion 20 is formed on a member provided on an inner side of an external wall of the apparatus body 2, and the position of the engagement portion 20 is fixed. Engaged with the engagement portion 130, the engagement portion 20 restricts a movement of the tank cover portion 13 from the close position to the open position and maintains the tank cover portion 13 at the close position.

The engagement portion 130 according to the present exemplary embodiment has a hook shape with a projection portion 130*a* at a distal end portion of the engagement portion 130. The projection portion 130*a* projects toward the swing center 13*a* in the Y-direction. The engagement portion 20, on the other hand, is a projection portion that projects toward an opposite side to the swing center 13*a* in the Y-direction, and the hook shape is formed by a depressed portion being formed in a lower portion of the engagement portion 20. The projection portion 130*a* is brought into contact with a lower surface 20*a* of the engagement portion 20 to thereby restrict the movement of the tank cover portion 13 from the close position to the open position. FIGS. 7A, 7B, 8A, and 8B illustrate an engagement form of the engagement portion 130 and the engagement portion 20 in moving the tank cover portion 13 from the open position to the close position.

As the operator moves the tank cover portion 13 from the open position to the close position, the projection portion 130*a* comes into contact with the engagement portion 20, and the engagement portion 130 is elastically deformed in an arrow direction (in the Y-direction opposite to the direction toward the swing center 13*a*) as illustrated in FIGS. 7A and 7B. Then, the projection portion 130*a* is moved downward over the engagement portion 20, and the engagement portion 130 is elastically restored in the direction of an arrow D2 (in the Y-direction toward the swing center 13*a*) as illustrated in FIGS. 8A and 8B. Consequently, the engagement portion 130 and the engagement portion 20 are engaged with each other. As the operator moves the tank cover portion 13 from the close position to the open position, the engagement portion 130 and the engagement portion 20 are disengaged from each other through a reverse process. While the engagement portion 130 is elastically deformed in the present exemplary embodiment, the engagement portion 20 can be deformed elastically. Alternatively, both the engagement portion 130 and the engagement portion 20 can be deformed elastically. Further, one or both of the tank cover portion 13 and the apparatus body 2 can partly be deformed elastically to displace the engagement portion 130 and the engagement portion 20.

During the elastic deformation of the engagement portion 130 from the state in FIG. 7B to the state in FIG. 8B, a moderate click feeling can be provided to the operator performing the operation. This enables the operator to feel that the tank cover portion 13 is moved to the close position and changed to the engagement state (that the injection portion 5*a* is closed with the cap portion 120Bk).

In order to provide a comfortable click feeling to the operator, appropriate management of an interference amount (an overlap amount in the Y-direction in a natural state) in moving the projection portion 130*a* over the engagement portion 20 is to be performed. With an excessively great interference amount, an elastic deformation amount of the engagement portion 130 in moving the projection portion 130*a* over the engagement portion 20 increases, and the operator is required to apply a great operation force. The great operation force may cause the operator to erroneously recognize that the tank cover portion 13 is moved to the close position. With an excessively small interference amount, on the other hand, the elastic deformation amount of the engagement portion 130 is so small that an adequate click feeling may not be produced.

In the design, the interference amount can be adjusted using a distance L0 from the swing center 13*a* of the tank cover portion 13 to the projection portion 130*a* and the engagement portion 20 as illustrated in FIG. 8A. In the present exemplary embodiment, however, the tank cover portion 13 is supported using components (the cam member 162) of the valve 16 so that the tank cover portion 13 can freely swing. The interference amount may vary due to a dimensional tolerance or an assembly error of the components.

Thus, in the present exemplary embodiment, an intermediate position of the tank cover portion 13 at the close position in the Y-direction is determined. Specifically, a contact portion 131 in the shape of a plate projecting from the inner wall surface of the tank cover portion 13 is integrally provided with the tank cover portion 13. The contact portion 131 projects in a direction intersecting a direction connecting the swing center 13*a* and the engagement portion 130 at a position between the swing center 13*a* and the engagement portion 130. In a state where the tank cover portion 13 is at the close position, the contact portion 131 projects downward in the Z-direction. The apparatus body 2 includes a contact portion 21, and the contact portion 131 is to come into contact with the contact portion 21.

An operation of bringing the contact portion 131 and the contact portion 21 into contact with each other will be described below with reference to FIGS. 7A and 8A. FIG. 7A illustrates a state during an operation of moving the tank cover portion 13 from the open position to the close position. A distal end of a contact surface 131*a* of the contact portion 131 is a curved surface, and the remaining part of the contact surface 131*a* is a flat surface. In the stage illustrated in FIG. 7A, the distal end of the contact surface 131*a* starts coming into contact with the contact portion 21. A contact surface of the contact portion 21 is a vertical surface. In the stage illustrated in FIG. 8A (the tank cover portion 13 has reached the close position), a flat surface portion of the contact surface 131*a* and the contact portion 21 are in contact with each other.

With the foregoing structure, the interference amount is adjusted using a distance L1 from the contact surface of the contact portion 131 and the contact portion 21 to the projection portion 130*a* and the engagement portion 20 as illustrated in FIG. 8A. Variation in the interference amount due to a dimensional tolerance or an assembly error of the components can be minimized. This makes it possible to provide a comfortable click feeling to the operator.

Valve

Next, the valve 16 will be described below. While mainly a structure of the valve 16 for the container 5Bk will be described below, the valves 16 for the containers 5C to 5Y have a similar structure.

FIGS. 9A and 9B are perspective views illustrating the tank cover portion 13 and the valve 16. The valve 16 includes a base member 160, a displacement member 161, the cam member 162, and a casing 166 and opens and closes the passages 14*a* and 15*a* of the container 5Bk simultaneously. The base member 160 includes support portions 160*a* and 160*b* each having a groove shape in the Y-direction. An intermediate portion of the supply tube 14 is placed on the support portion 160*a*, and an intermediate portion of the air communication tube 15 is placed on the support portion 160*b*. Further, the base member 160 includes a slot 160*c* extending in a direction intersecting the support portions 160*a* and 160*b* (i.e., a direction across the tubes 14 and 15), and the displacement member 161 is inserted in the slot 160*c* so that the displacement member 161 can freely change in position in the Z-direction (radial direction of the tubes 14 and 15). The cam member 162 is a shaft-shaped member as a whole and is placed on top of the displacement member 161. The casing 166 supports the cam member 162 so that the cam member 162 can freely rotate about an axis in the X-direction. The casing 166 accommodates central portions of the displacement member 161 and the cam member 162 in the axial direction, and is fixed to the base member 160.

The cam member 162 includes a cam surface 163 at a central portion of the cam member 162 in the axial direction. The cam surface 163 is to come into contact with the displacement member 161. The cam surface 163 is formed to press the displacement member 161 in a direction to squash the tubes 14 and 15 as the cam member 162 is rotated in a direction D3. This closes the passages 14*a* and 15*a*. The cam surface 163 is formed to release the press of the tubes 14 and 15 as the cam member 162 is rotated in a direction D4 (opposite direction to the direction D3). This opens the passages 14*a* and 15*a*.

A contact portion 164 having a lever shape is formed at an end portion of the cam member 162 in the axial direction. The contact portion 164 comes into contact with a contact portion 133 of the tank cover portion 13. While the tank cover portion 13 swings in an opening direction, the contact portion 133 comes into contact with the contact portion 164, and this causes the cam member 162 to rotate in the direction D3.

Further, a projection portion 165 having a lever shape is formed at another end portion of the cam member 162 in the axial direction. In the present exemplary embodiment, a function of the projection portion 165 is only to clarify an orientation of the cam member 162.

Figure 10A:
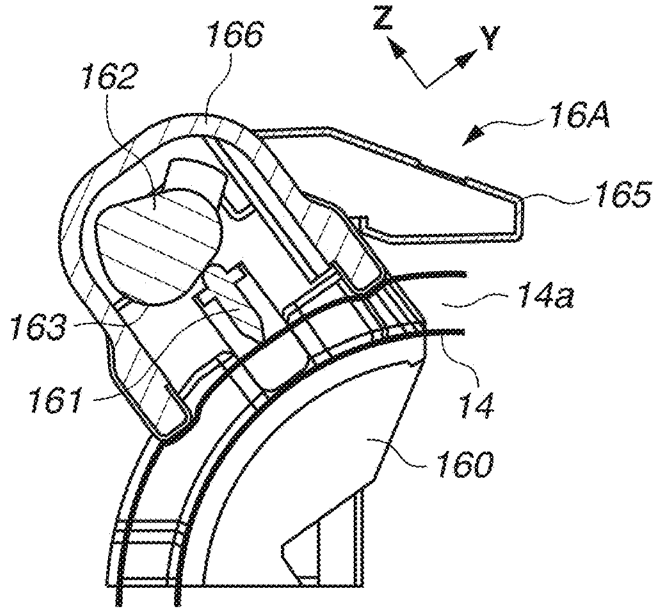
FIGS. 10A, 10B, and 10C are cross-sectional views illustrating operations of the valve according to the first exemplary embodiment.
Figure 10C:
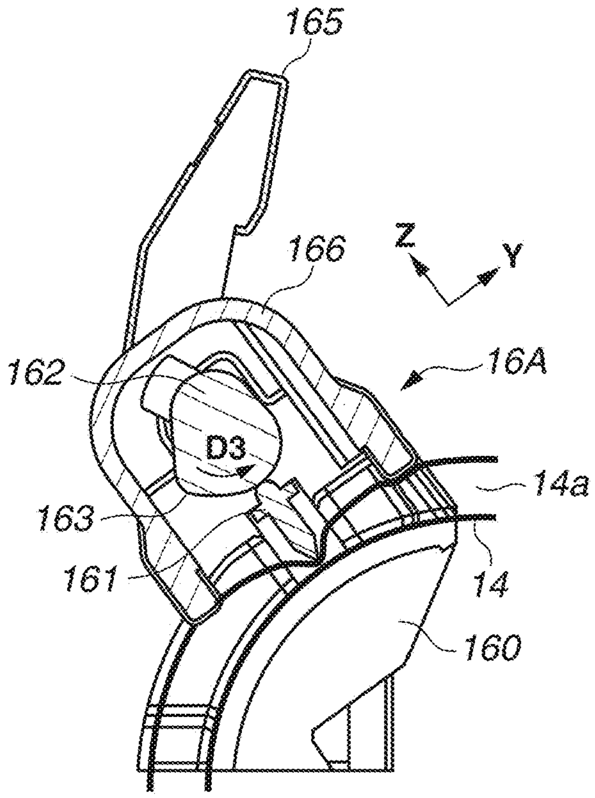
Figure 10B:
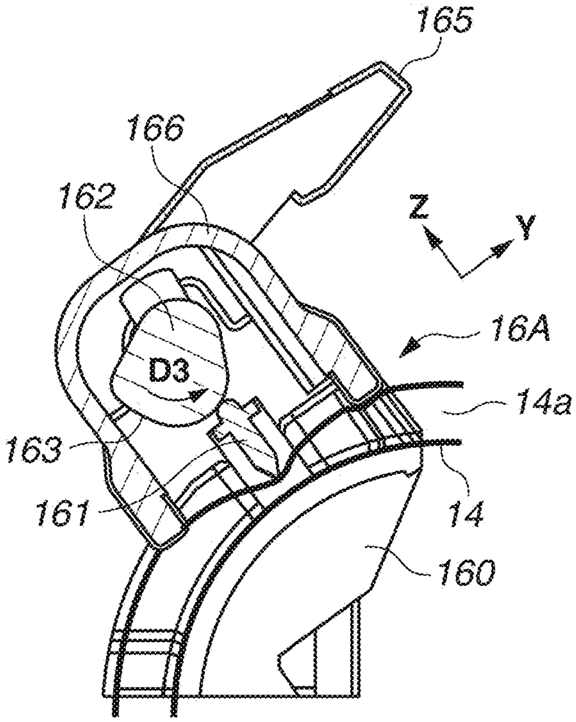

FIGS. 10A to 10C are cross-sectional views illustrating operations of the valve 16 and illustrate how the passage 14*a* is closed in stages. FIG. 10A illustrates a state where the valve 16 allows the passage 14*a* to be open. As illustrated in FIG. 10B, as the cam member 162 is rotated in the direction D3, the cam surface 163 presses the displacement member 161 against the supply tube 14 to start squashing the supply tube 14. Then, as illustrated in FIG. 10C, the supply tube 14 is squashed, and the passage 14*a* is closed. The same applies to the passage 15*a* and the air communication tube 15 although not illustrated.

Figure 11A:
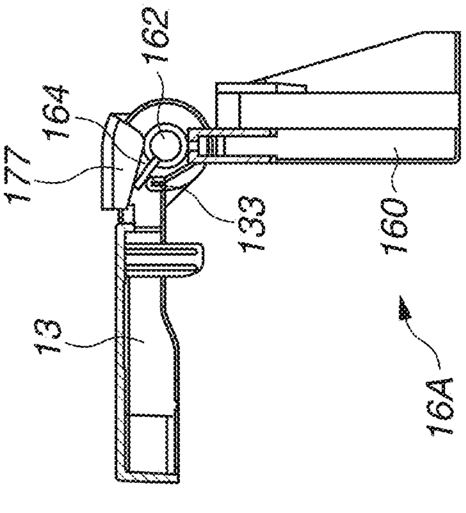
FIGS. 11A, 11B, and 11C are cross-sectional views illustrating operations of the valve and a cam lever member according to the first exemplary embodiment.
Figure 11B:
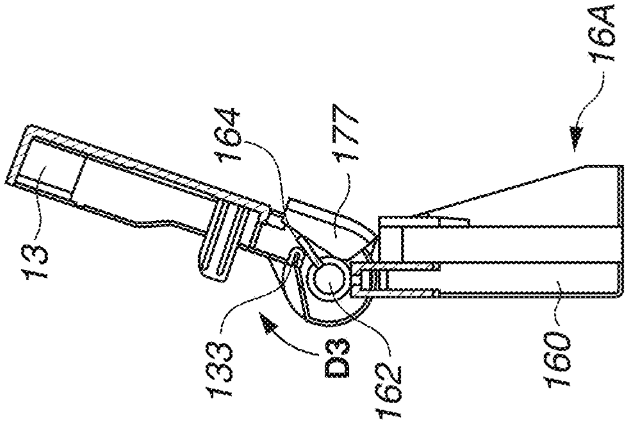
Figure 11C:
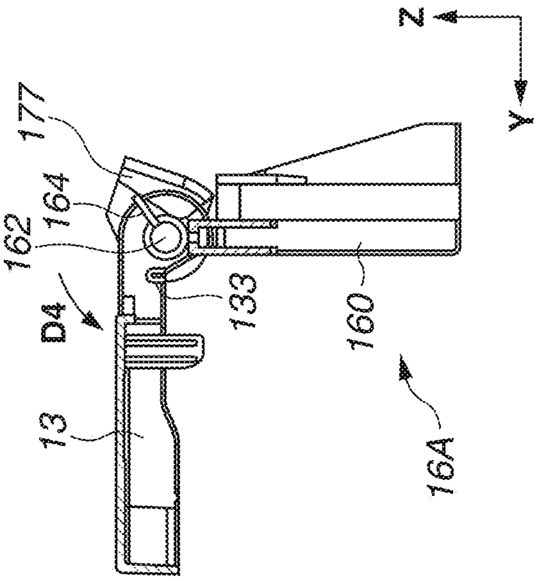

FIGS. 11A to 11C illustrate a rotation form of the cam member 162 and a cam lever member 177 along with the movement of the tank cover portion 13. FIG. 11A illustrates a state where the tank cover portion 13 is at the close position. In this state, the valve 16 allows the passages 14*a* and 15*a* to be open. FIG. 11B illustrates a state where the tank cover portion 13 is moved from the close position to the open position. Since the contact portions 133 and 164 come into contact with each other, the cam member 162 and the cam lever member 177 are rotated in the direction D3 as the tank cover portion 13 is moved. Consequently, the passages 14*a* and 15*a* are closed by the principle illustrated in FIGS. 10A to 10C. During the ink replenishment, the passages 14*a* and 15*a* are reliably closed by the valve 16.

The contact portion 133 and the contact portion 164 come into contact with each other only by a swing of the tank cover portion 13 in the opening direction. In a case where the tank cover portion 13 is returned to the close position as illustrated in FIG. 11C from the state illustrated in FIG. 11B, the contact portion 133 and the contact portion 164 do not come into contact with each other. Therefore, the cam member 162 and the cam lever member 177 do not rotate in the direction D4, and the valve 16 does not operate along with the movement of the tank cover portion 13.

Figure 12:
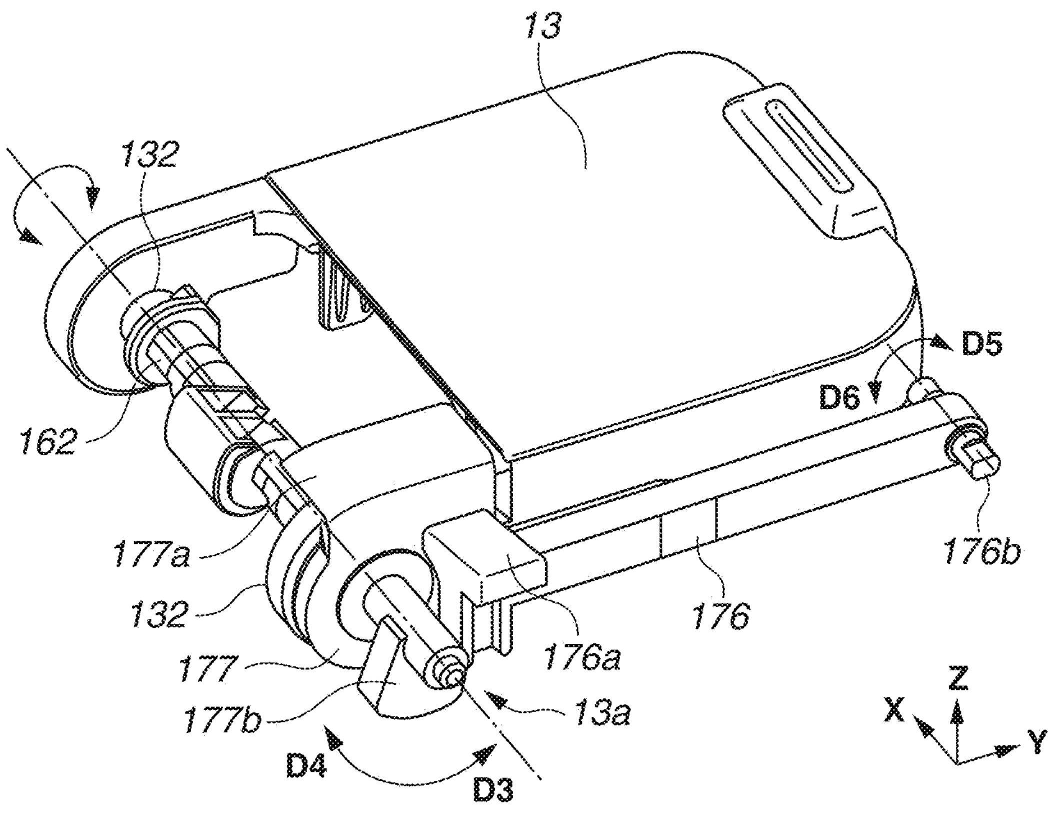
FIG. 12 is a perspective view illustrating a structure of a cam lever portion according to the first exemplary embodiment.

FIG. 12 is a perspective view illustrating a structure of a cam lever portion 177*b*. As described above, the shaft portion of the cam member 162 is inserted in the pair of bearing portions 132 of the tank cover portion 13, and the tank cover portion 13 is supported so that the tank cover portion 13 can freely swing on the swing center 13*a* as a center. The cam lever member 177 is attached to one of the pair of bearing portions 132 and can swing on the swing center 13*a* as a center. An end portion 177*a* of the cam lever member 177 is in a state of covering part of the tank cover portion 13. Thus, in moving the tank cover portion 13 from the close position to the open position, the cam lever member 177 is moved upward by the tank cover portion 13 and is pivoted in a direction D3.

On the contrary, the cam lever member 177 moved upward by the tank cover portion 13 and pivoted does not move along with the tank cover portion 13 in moving the tank cover portion 13 from the open position to the close position. Thus, simply moving the tank cover portion 13 from the open position to the close position does not restore the state in FIG. 12 where the end portion 177*a* of the cam lever member 177 covers the part of the tank cover portion 13.

Further, the cam lever member 177 includes a cam lever portion 177*b* as an operating portion, and the cam lever portion 177*b* rotates about the swing center 13*a* along with the pivoting of the cam lever member 177. The cam lever portion 177*b* is configured to come into contact with a lever press portion 176*a*. A lever member (moving member) 176 is a member that can swing on a central shaft 176*b* as a center.

Thus, the cam lever portion 177*b* moves along with operations of the lever member 176, and the lever member 176 moves along with operations of the cam lever portion 177*b*. For example, in a case where the cam lever member 177 pivots in the direction D3, the cam lever portion 177*b* also rotates in the direction D3 from the position in FIG. 12. In this case, the lever press portion 176*a* comes into contact with the cam lever portion 177*b* and is pushed upward as the cam lever portion 177*b* is rotated in the direction D3.

Figure 13A:
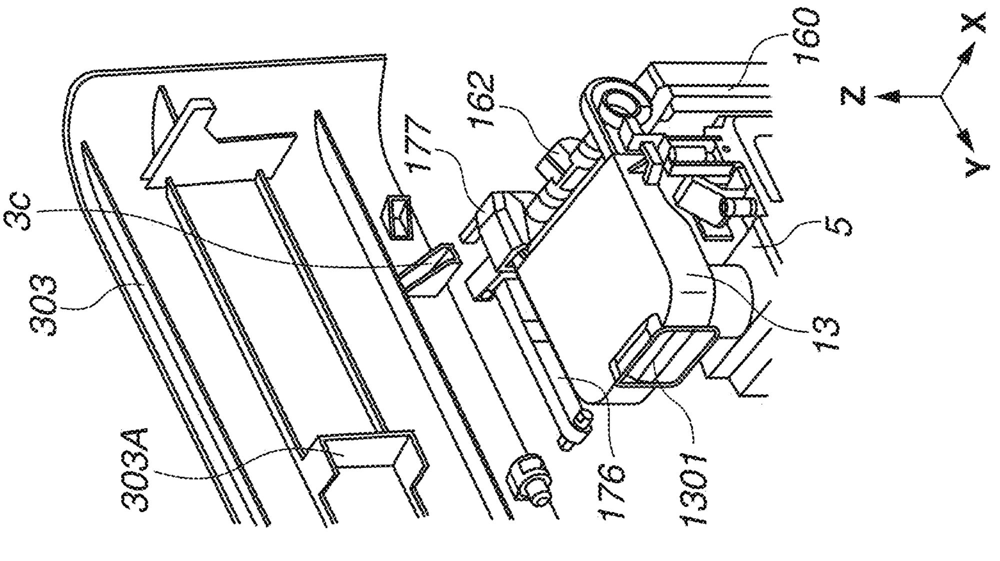
FIGS. 13A, 13B, and 13C are perspective views illustrating operations of the valve and the cam lever member as viewed from a +X direction according to the first exemplary embodiment.
Figure 13B:
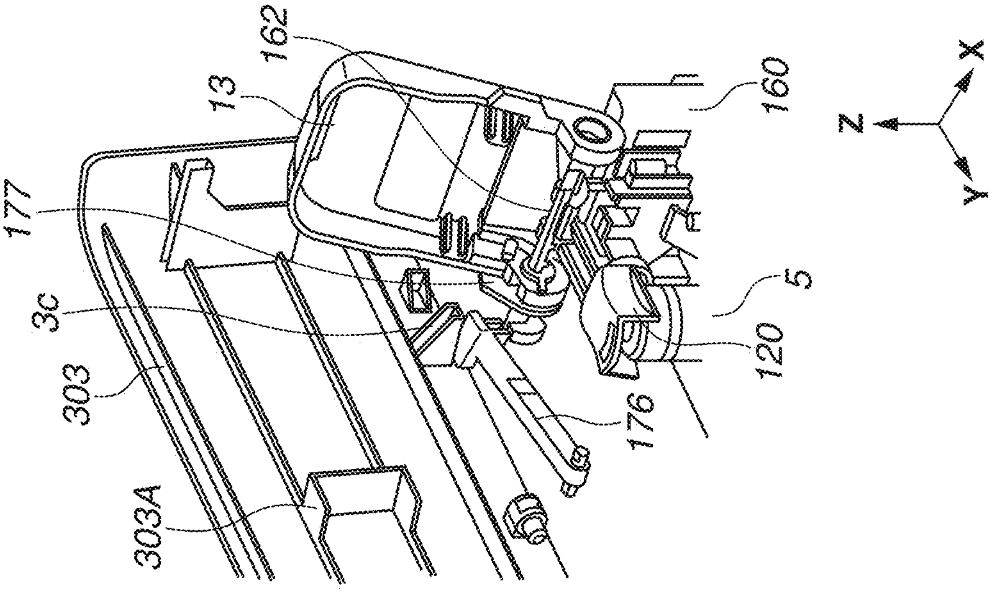
Figure 13C:
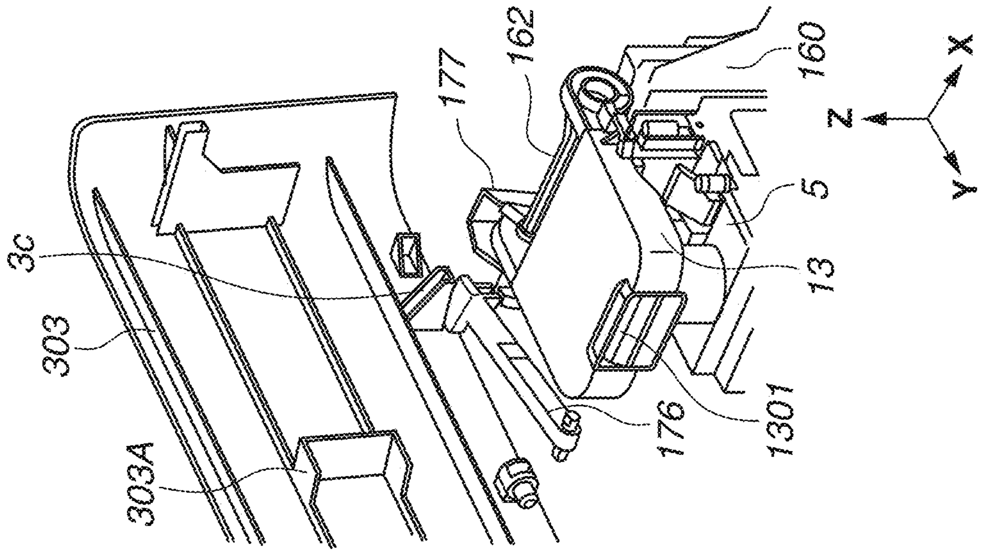
Figure 14A:
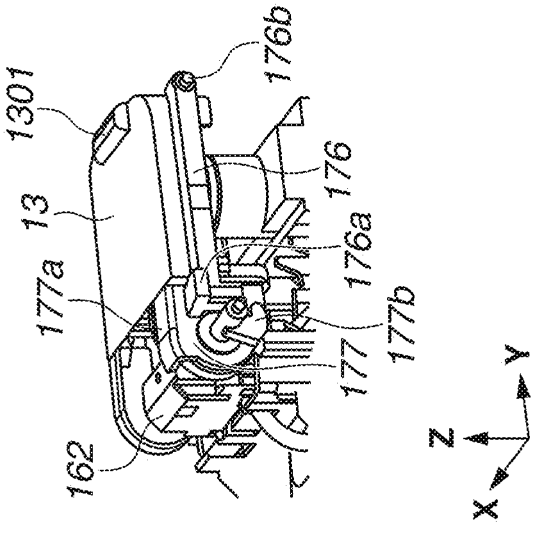
FIGS. 14A, 14B, and 14C are perspective views illustrating operations of the valve and the cam lever member as viewed from a −X direction according to the first exemplary embodiment.
Figure 14B:
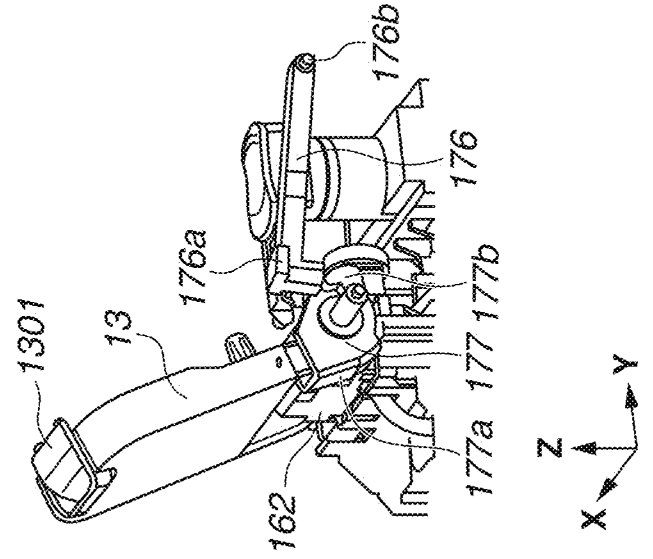
Figure 14C:
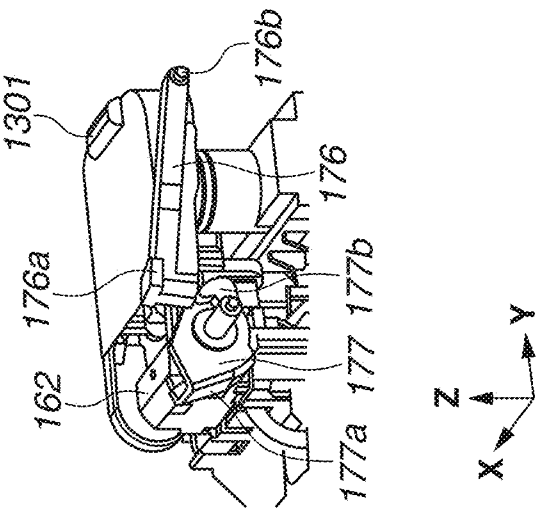

FIGS. 13A to 13C and 14A to 14C illustrate rotation forms of the cam member 162 along with the movement of the tank access cover 303 and operations of the lever member 176 and the cam lever member 177. FIGS. 13A, 13B, and 13C are perspective views from the positive X-direction, whereas FIGS. 14A, 14B, and 14C are perspective views from the negative X-direction. FIGS. 13A and 14A illustrate a state where the tank access cover 303 has been moved from the close position to the open position. In this state, the tank cover portion 13 is at the close position as illustrated in FIG. 11A, and the passages 14*a* and 15*a* are open. Further, the end portion 177*a* of the cam lever member 177 is in a state of covering the tank cover portion 13.

FIGS. 13B and 14B illustrate a state where the tank cover portion 13 is moved to the open position from the state where the tank access cover 303 is at the open position as illustrated in FIGS. 13A and 14A. In this state, the tank cover portion 13 is in the state illustrated in FIG. 11B, both the tank access cover 303 and the tank cover portion 13 are at the open positions, and the passages 14*a* and 15*a* are closed by the valve 16. The tank cover portion 13 is provided with an operational portion 1301 having a shape including a depressed portion. A user can hold the depressed portion of the operational portion 1301 by hooking the user's fingers therein, and this improves operability in opening and closing the tank cover portion 13 by the user.

As described above, the lever press portion 176*a* of the cam lever member 177 covers part of an upper surface of the tank cover portion 13. Thus, in moving the tank cover portion 13 from the close position to the open position, the cam lever member 177 also pivots in the direction D3 in FIG. 12 along with the operation of the tank cover portion 13. This causes the cam lever portion 177*b* to pivot in the direction D3 and push the lever press portion 176*a* upward. Consequently, the lever member 176 changes from the state illustrated in FIG. 13A to a state where the lever member 176 is pivoted upward on the central shaft 176*b*. In this state, the lever press portion 176*a* of the lever member 176 is near a projection portion 3*c* of the tank access cover 303. The projection portion 3*c* is positioned to overlap the lever press portion 176*a* at least partially when the liquid discharge apparatus 1 is viewed from above on the Z-axis. In the present exemplary embodiment, the projection portion 3*c* is provided on a shaft side (lower end side in the Z-direction in FIGS. 13A, 13B, and 13C) of rotation and movement of the tank access cover 303, which is on the opposite side of an end portion (end side of the liquid discharge apparatus 1, upper end side in the Z-direction in FIGS. 13A, 13B, and 13C) of the tank access cover 303 that a user holds for operations.

FIGS. 13C and 14C illustrate a state where the tank cover portion 13 is moved to the close position from the states illustrated in FIGS. 13B and 14B. The tank cover portion 13 is at the close position as in the state in FIG. 11C, and the tank access cover 303 is at the open position. As described above, since the cam lever member 177 does not move along with a movement of the tank cover portion 13 to the close position, the cam lever member 177 maintains the state of being pivoted in the direction D3 in FIG. 13B. The lever member 176 also maintains the state in FIG. 13B similarly to the cam lever member 177. Specifically, in this state, the state where the valve 16 closes the passages 14*a* and 15*a* continues.

Figure 15:
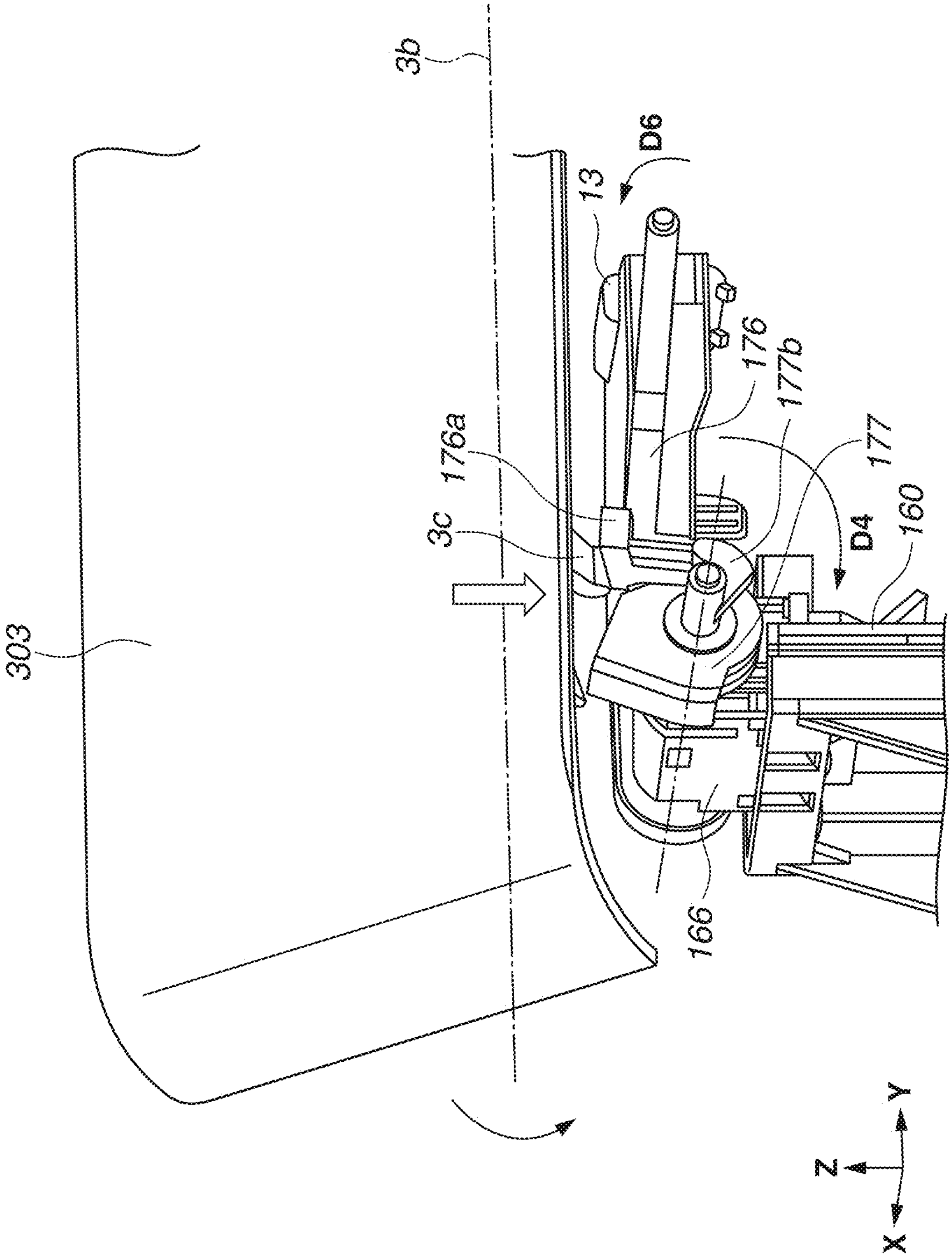
FIG. 15 is a perspective view illustrating operations in moving a tank access cover to a close position according to the first exemplary embodiment.

FIG. 15 is a perspective view illustrating how the tank access cover 303 is moved from the open position to the close position as viewed from the back on an X-axis. A user can close the tank access cover 303 in the state where the tank cover portion 13 is at the close position. Operations of components in moving the tank access cover 303 to the close position from the state in FIG. 13C will be described below.

In the state illustrated in FIG. 13C, the lever press portion 176*a* is near the projection portion 3*c* of the tank access cover 303. As described above, the projection portion 3*c* is positioned to overlap the lever press portion 176*a* at least partially when the liquid discharge apparatus 1 is viewed from above on the Z-axis. Thus, as the tank access cover 303 is moved in the direction (closing direction) from the open position to the close position, the projection portion 3*c* and the lever press portion 176*a* come into contact with each other. Further, as the tank access cover 303 is moved in the closing direction, the lever press portion 176*a* is pushed downward by the projection portion 3*c*, and the lever member 176 pivots in a direction D6. Since the lever press portion 176*a* is in contact with the cam lever portion 177*b*, a force that the lever member 176 receives from the projection portion 3*c* is transmitted to the cam lever portion 177*b* via the lever press portion 176*a*.

The cam lever portion 177*b* receives a downward force from the lever press portion 176*a* and rotates in the direction D4. This causes the cam lever member 177 to pivot in the direction D4.

In this case, the contact portion 164 of the cam member 162 comes into contact with the end portion 177*a* of the cam lever member 177 pivoting in the direction D4, and the cam member 162 also rotates in the direction D4, so that the displacement member 161 is displaced and the passages 14*a* and 15*a* are opened. As described above, the opening operation of the valve 16 is linked with the movement of the tank access cover 303 to the close position, whereby the passages 14*a* and 15*a* are reliably opened. As described above, the projection portion 3*c*, which is a point of application of force to the lever press portion 176*a*, is positioned far from a point of effort of holding the tank access cover 303 by a user and close to the shaft for rotation and movement of the tank access cover 303. The force of the user operation of moving the tank access cover 303 in the closing direction is efficiently transmitted to the projection portion 3*c* and is used as a force to push the lever press portion 176*a* downward. Thus, the user can open and close the valve 16 with less force.

Alternatively, the cam lever portion 177*b* is pivoted in the direction D4 by the lever member 176 and thereafter is further pivoted in the direction D4 by a reaction force from the passages 14*a* and 15*a* pushed by the cam member 162. Further, the projection portion 3*c* can come into contact with the lever press portion 176*a* and push the lever press portion 176*a* so that the lever member 176 pivots in the direction D6, or the projection portion 3*c* can come into contact with a portion of the lever member 176 so that the lever member 176 pivots. For example, the projection portion 3*c* can come into contact with not the lever press portion 176*a* but the central shaft 176*b* so that the lever member 176 pivots in the direction D6. In this case, a projecting length of the projection portion 3*c* is increased to push the lever member 176 downward.

In a case where the tank access cover 303 swings in the closing direction, the projection portion 3*c* and the lever member 176 come into contact with other, whereas in a case where the tank access cover 303 swings in the opening direction, the projection portion 3*c* and the lever member 176 are separated from each other. Thus, an operation of moving the tank access cover 303 to the open position does not act on operations of the lever member 176 and the cam lever member 177. Therefore, simply moving the tank access cover 303 in the opening direction does not cause the valve 16 to close the passages 14*a* and 15*a*.

In the present exemplary embodiment, the tank cover portion 13 at the open position stands while being inclined backward from a vertical position as illustrated in FIGS. 5B, 6B, and 13B. Thus, in this state, the body cover portion 3 cannot be moved from the open position to the close position because the body cover portion 3 interferes with the tank cover portion 13 during the movement. In other words, the tank cover portion 13 being opened restricts the movement of the tank access cover 303 to the close position. This prevents a situation where the tank access cover 303 is erroneously closed and the valve 16 is changed to the open state during ink replenishment.

As described above, in the present exemplary embodiment, an operation of moving the tank cover portion 13 in the closing direction does not open the valve 16. Thus, even in a case where the tank cover portion 13 is moved to the close position before the cap portion 120 adequately closes the injection portion 5*a*, the valve 16 does not open, so that a leakage of the ink from the discharge head 4 and a flow of the ink into the buffer room 53 are prevented.

Example of Detection and Control of Opening and Closing of Cover Portion

The cover detection sensor 35*a* illustrated in FIG. 4 detects the position of the tank access cover 303. For example, the cover detection sensor 35*a* is a mechanical switch that is pressed in a case where the tank access cover 303 is at the close position, or an optical sensor that optically detects the tank access cover 303 being at the close position. As described above, in a state where the tank access cover 303 is at the close position, the valve 16 is in the open state, and ink can be supplied to the discharge head 4. In order to prevent a recording operation from being performed in a state where ink cannot be supplied, a recording operation can be performed by referring to a result of detection by the cover detection sensor 35*a*.

Figure 16:
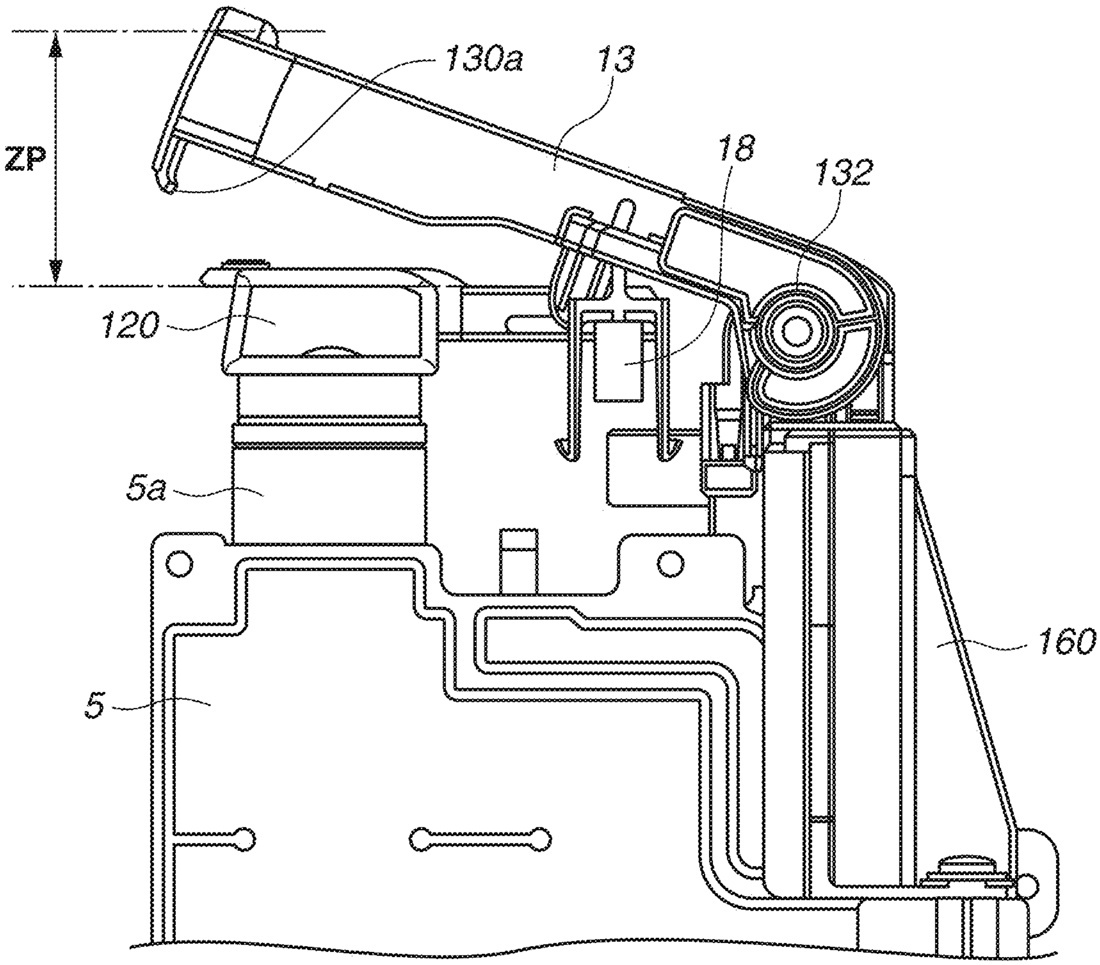
FIG. 16 is a side view illustrating a state where an engagement portion of a tank cover portion is not engaged according to the first exemplary embodiment.

FIG. 16 is a view illustrating a state where the engagement portion 130 of the tank cover portion 13 is not engaged with the engagement portion 20. In the present exemplary embodiment, the tank cover portion 13 is provided with an urging member 18. The urging member 18 urges the tank cover portion 13 upward, and in a case where the engagement portion 130 and the engagement portion 20 are disengaged, the urging member 18 urges the tank cover portion 13 so that the tank cover portion 13 is maintained at a position far from the close position in the opening direction. Consequently, the tank cover portion 13 is in a state of being lifted by a distance ZP, and the user can visually recognize that the tank cover portion 13 is not moved to the close position.

Figure 17:
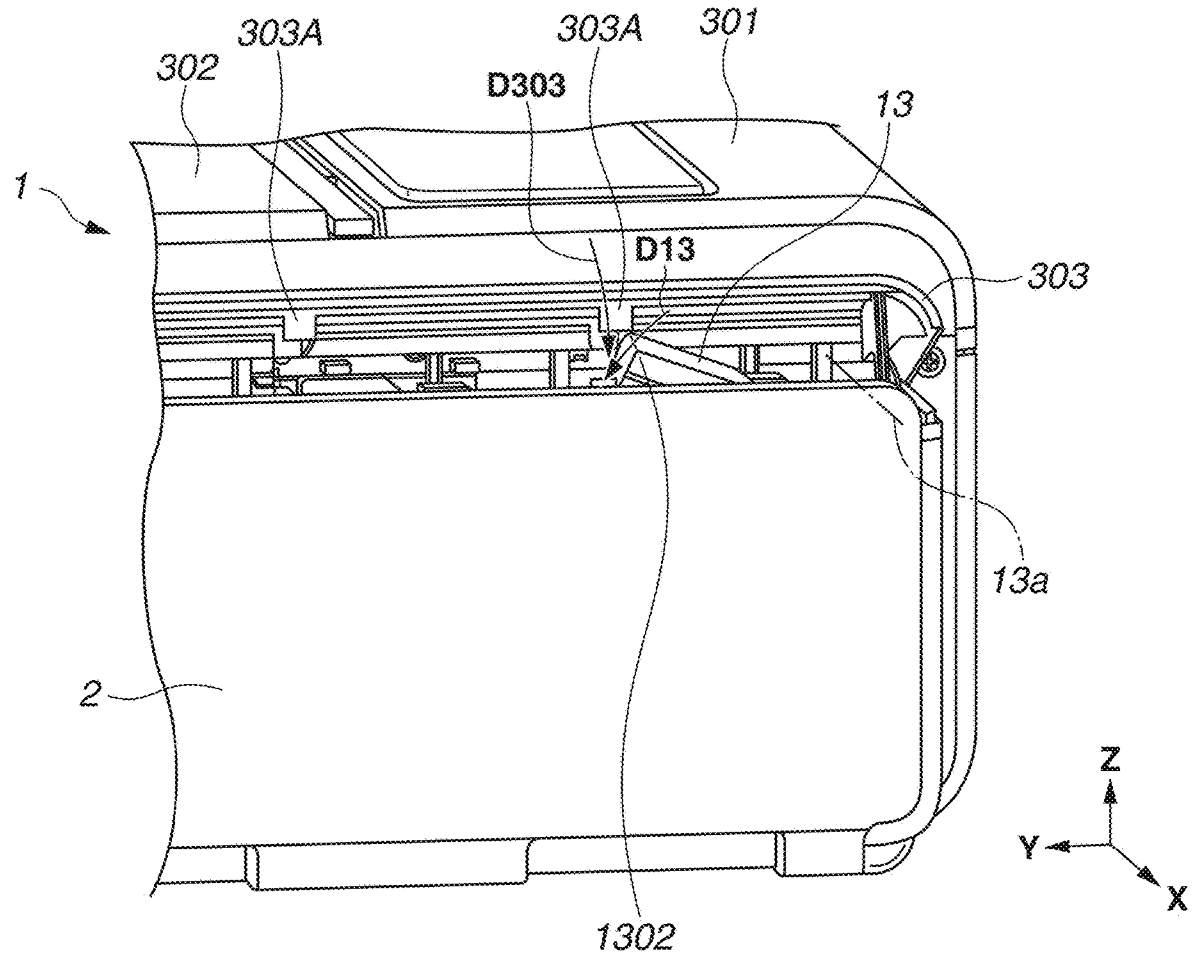
FIG. 17 is a perspective view illustrating a relationship between the tank access cover and the tank cover portion in a case where the tank access cover is moved to the close position in a state where the tank cover portion is not at a close position according to the first exemplary embodiment.

FIG. 17 is a perspective view illustrating a relationship between the tank access cover 303 and the tank cover portion 13 in a case where the tank access cover 303 is moved to the close position in a state where the tank cover portion 13 is not at the close position. As described above, in the state where the engagement portion 130 and the engagement portion 20 are not engaged with each other, the tank cover portion 13 is in the state of being lifted by the urging member 18. The tank access cover 303 is provided with a rib 303A as a rib portion, and in moving the tank access cover 303 from the open position to the close position, the rib 303A moves along a movement locus D303. The rib 303A is provided to a surface of the tank access cover 303 on a side close to the liquid discharge apparatus 1, i.e., a surface of the tank access cover 303 that faces the tank cover portion 13 in a state where the tank access cover 303 is at the close position.

A distal end portion 1302 of the tank cover portion 13 in a state of being lifted by the urging member 18 is at a position to interfere with the movement locus D303 of the rib 303A. Specifically, in moving the tank access cover 303 to the close position in the state where the tank cover portion 13 is lifted, the rib 303A and the distal end portion 1302 of the tank cover portion 13 come into contact with each other as illustrated in FIG. 17. A movement locus D13 of the distal end portion 1302 of the tank cover portion 13 is a locus including a movement by an operation in the Y-direction, whereas the movement locus D303 of the tank access cover 303 is a locus including a movement by an operation in the X-direction.

The movement locus D13 of the tank cover portion 13 and the movement locus D303 of the rib 303A are loci including the movements by the operations in different directions. Thus, moving the tank access cover 303 in the closing direction in a state where the distal end portion 1302 is in contact with the rib 303A causes the tank access cover 303 and the tank cover portion 13 to prop against each other and block operations of each other.

Thus, in the state where the tank cover portion 13 is lifted by the urging member 18, the tank access cover 303 cannot be moved to the close position, and the cover detection sensor 35*a* detects the tank access cover 303 being not at the close position.

The tank cover portion 13 according to the present exemplary embodiment is provided with the operational portion 1301 as illustrated in FIGS. 13A to 13C. The rib 303A is caught by the depressed portion of the operational portion 1301, whereby the tank cover portion 13 and the rib 303A interfere with each other more easily.

While mainly an effect of the rib 303A for the container 5Bk is described above, ribs 303A for the respective containers 5C to 5Y also provide a similar effect.

Alternatively, the tank cover portion 13 can be without the urging member 18. In a case where the tank cover portion 13 does not include the urging member 18 and the engagement portion 130 and the engagement portion 20 are not engaged with each other, a distal end of the contact surface 131*a* is in contact with the contact portion 21 as illustrated in FIG. 7A. The rib 303A of the tank access cover 303 is provided to be in contact with the distal end portion 1302 of the tank cover portion 13 in the above-described state, whereby the movement of the tank access cover 303 is blocked in the same manner as described above. Thus, the tank access cover 303 cannot be moved to the close position in a state where the tank cover portion 13 is not at the close position even in a case where the tank cover portion 13 is not in a state of being lifted by the urging member 18. Therefore, in this case, the cover detection sensor 35*a* detects the tank access cover 303 being not at the close position.

With the foregoing structure, the tank access cover 303 cannot be moved to the close position in a state where the tank cover portion 13 is not at the close position, and the state is detected by the cover detection sensor 35*a*. As described above, the valve 16 is opened in a state where the tank access cover 303 is at the close position. This prevents a situation where the cover detection sensor 35*a* detects the tank access cover 303 being not at the close position and a recording operation is started while the passages 14*a* and 15*a* being closed are overlooked.

Figure 18:
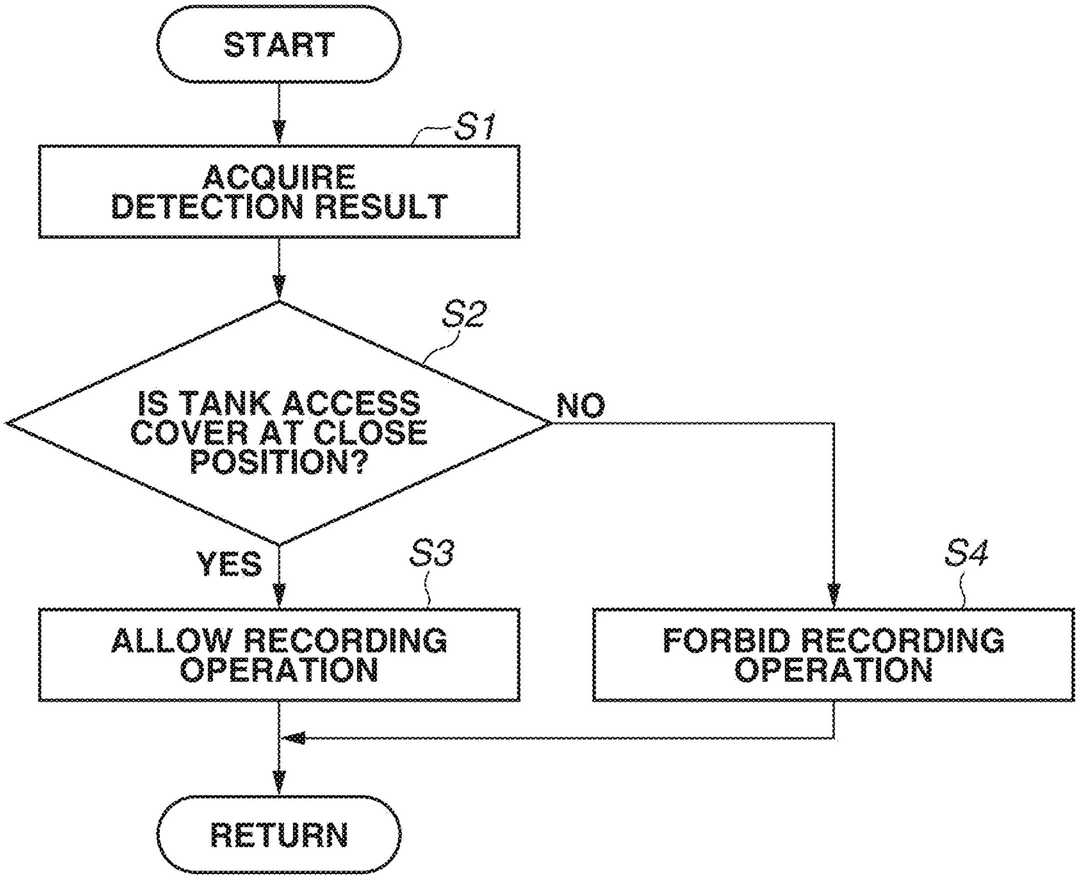
FIG. 18 is a flowchart illustrating an example of a process that a micro-processing unit (MPU) performs according to the first exemplary embodiment.

FIG. 18 is a flowchart illustrating an example of a process that the MPU 31 performs. The process relates to making a setting to allow or forbid performance of a recording operation and is performed periodically.

In step S1, a detection result of the cover detection sensor 35*a* is acquired. In step S2, whether the tank access cover 303 is at the close position is determined based on the detection result acquired in step S1.

In a case where it is determined that the tank access cover 303 is at the close position (YES in step S2), the processing proceeds to step S3. In a case where it is determined that the tank access cover 303 is not at the close position (NO in step S2), the processing proceeds to step S4.

In step S3, a setting to allow a recording operation is made. In a case where a new recording job instruction is received from the host computer 100, the recording operation is started. In step S4, a setting to forbid a recording operation is made. The recording operation is not started even in a case where a new recording job instruction is received from the host computer 100.

Further, in a case where the setting to forbid a recording operation is set during a recording operation, the recording operation is stopped. A notification to prompt the operator to move the tank access cover 303 to the close position can be provided.

Maintaining Sealing Capability of Cap Portion

In a case where the cap portion 120 closes the injection portion 5*a* and a foreign substance such as hair is between the cap portion 120 and the injection portion 5*a*, ink may leak. There is known a method for preventing leakage by applying a sealing liquid to the seal portion 123. In a case where a foreign substance is between the cap portion 120 and the injection portion 5*a*, the sealing liquid fills a space between the cap portion 120 and the injection portion 5*a* and prevents the leakage of the ink.

The sealing liquid, however, may erroneously be wiped off by an operator during ink replenishment. In a case where a foreign substance becomes stuck thereafter, an ink leakage may occur. Thus, grooves may be formed in the distal end portion 124 of the cap portion 120, and the sealing liquid may be applied to the grooves. The sealing liquid is held in the grooves and is thus prevented from being erroneously wiped off by the operator.

Figure 19A:
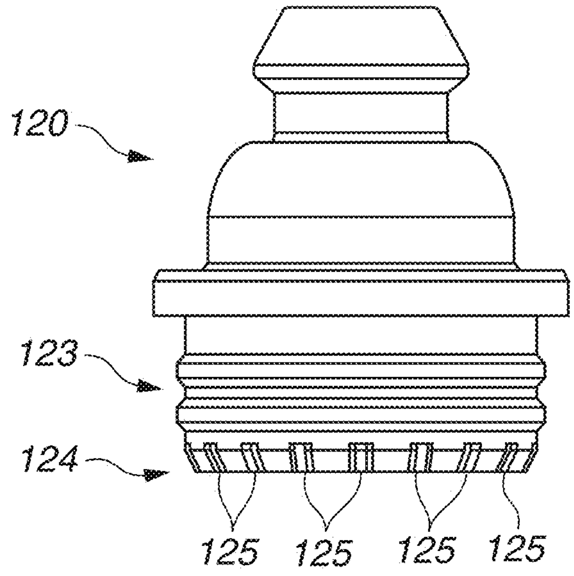
FIG. 19A is a side view illustrating the cap portion according to the first exemplary embodiment.
Figure 19B:
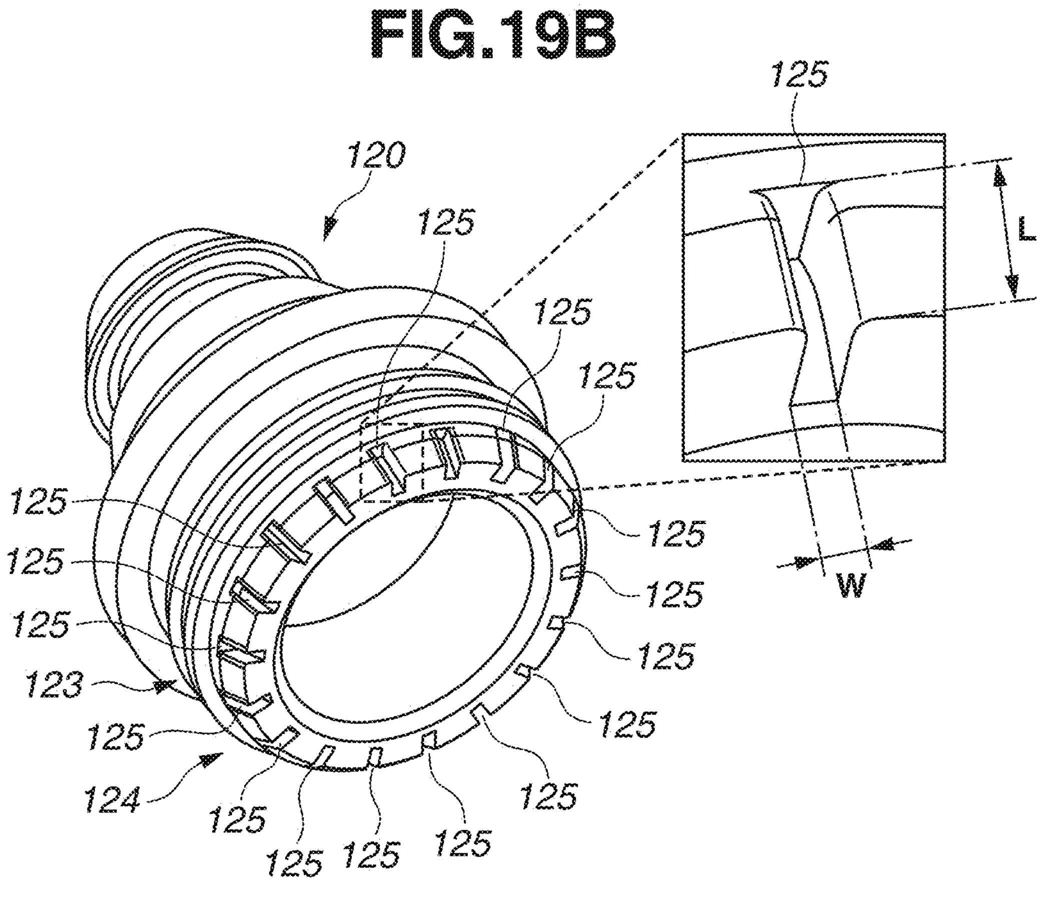
FIG. 19B is a perspective view and a partial enlarged view illustrating the cap portion according to the first exemplary embodiment.

FIGS. 19A and 19B are views illustrating an example of the cap portion 120. FIG. 19A is a side view illustrating the cap portion 120, and FIG. 19B is a perspective view and a partial enlarged view illustrating the cap portion 120. A plurality of grooves 125 is formed in an outer periphery of the distal end portion 124 in a circumferential direction of the outer periphery. In the present exemplary embodiment, the plurality of grooves 125 is arranged at equal pitches in the circumferential direction.

Each of the grooves 125 has a depth D in a radial direction of an opening defined by the distal end portion 124, a width W in the circumferential direction, and a length L in a direction oblique to an axial direction. The sealing liquid is applied in advance to the seal portion 123 and the distal end portion 124 before shipment from the factory and is held in the grooves 125.

Figure 20A:
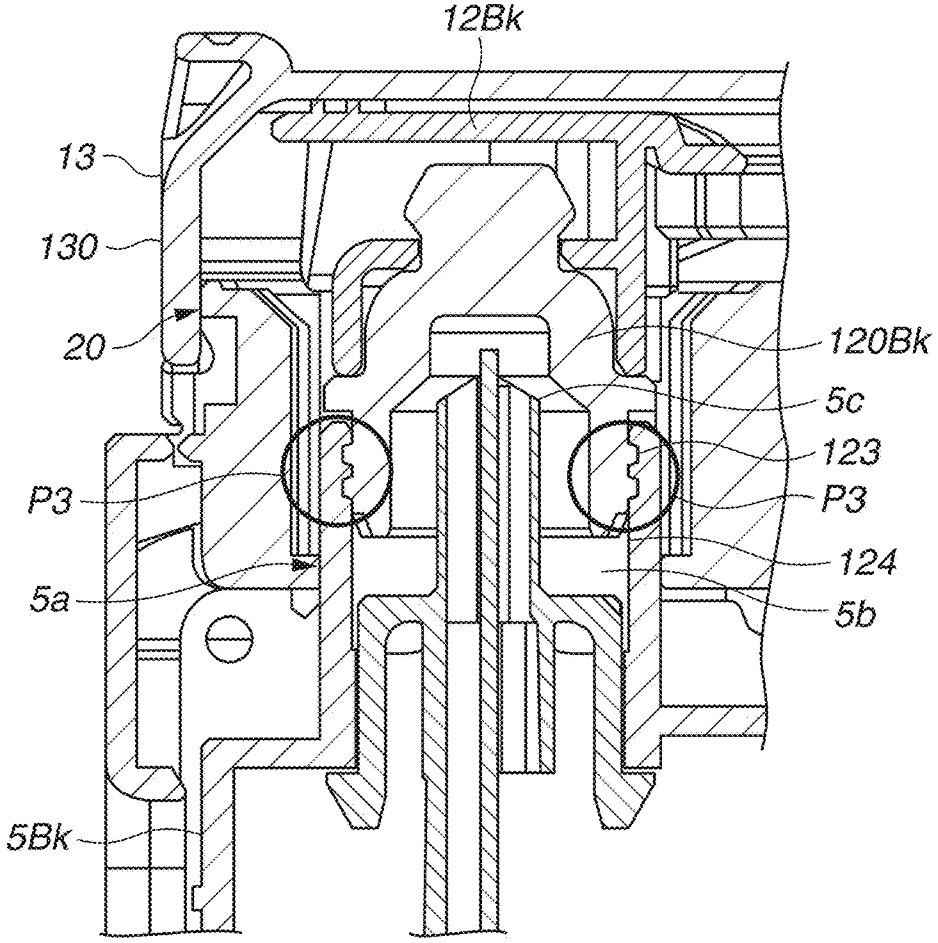
FIG. 20A is a cross-sectional view illustrating an example of an ink leakage portion according to the first exemplary embodiment.

With the foregoing form, even in a case where an operator attempts to wipe off the sealing liquid on the cap portion 120, since the sealing liquid in the plurality of grooves 125 is at deep positions, the sealing liquid is less likely to be wiped off completely. Thus, even in a case where a foreign substance becomes stuck between the cap portion 120 and the injection portion 5*a* thereafter, the sealing liquid in the grooves 125 is guided to spaces around the foreign substance due to capillary action, and an ink leakage is prevented. For example, even in a case where a foreign substance such as hair becomes stuck in a portion P3 circled in FIG. 20A (portion between the seal portion 123 and an inner wall surface of the injection hole 5*b*) and small spaces are formed, the sealing liquid in the grooves 125 fills the small spaces to prevent the leakage of the ink.

The depth D of the grooves 125 is set to a value greater than or equal to the width W ($D \geq W$), whereby a specific surface area is increased and sealing liquid holding performance of the grooves 125 improves. The sealing liquid can contain a hygroscopic component such as glycerin. This enables the sealing liquid to absorb moisture from the air in the container 5 to make it easier to fill the grooves 125 with the sealing liquid.

Figure 20B:
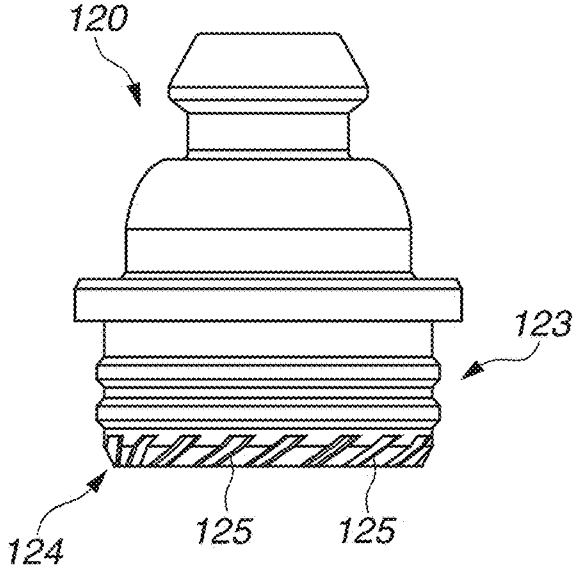
FIGS. 20B and 20C are perspective views illustrating another example of a structure of grooves of the cap portion according to the first exemplary embodiment.
Figure 20C:
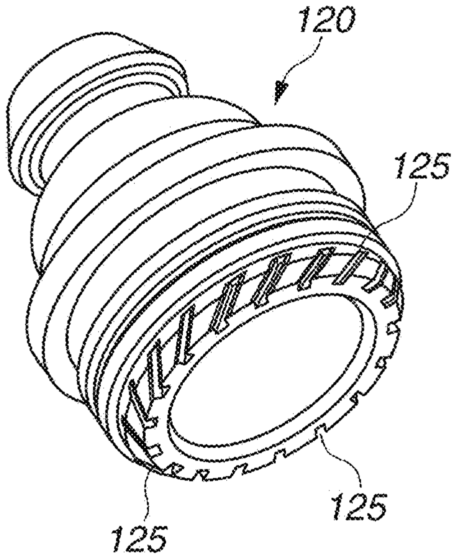

The form of each of the grooves 125 is not limited to the form illustrated as an example in FIGS. 19A and 19B. For example, as illustrated in FIGS. 20B and 20C, a lengthwise direction of the grooves 125 can be oblique in the circumferential direction with respect to a virtual plane passing through a central axis of the opening defined by the distal end portion 124. Further, while the cap portion 120 is inserted in the injection portion 5*a* to close the injection portion 5*a* in the present exemplary embodiment, the injection portion 5*a* can be inserted in the cap portion 120. In this case, the grooves 125 can be formed in an inner wall surface of the opening in which the injection portion 5*a* is inserted.

A second exemplary embodiment of the present disclosure will be described below. Redundant descriptions of components similar to those according to the first exemplary embodiment described above are omitted.

Figure 21:
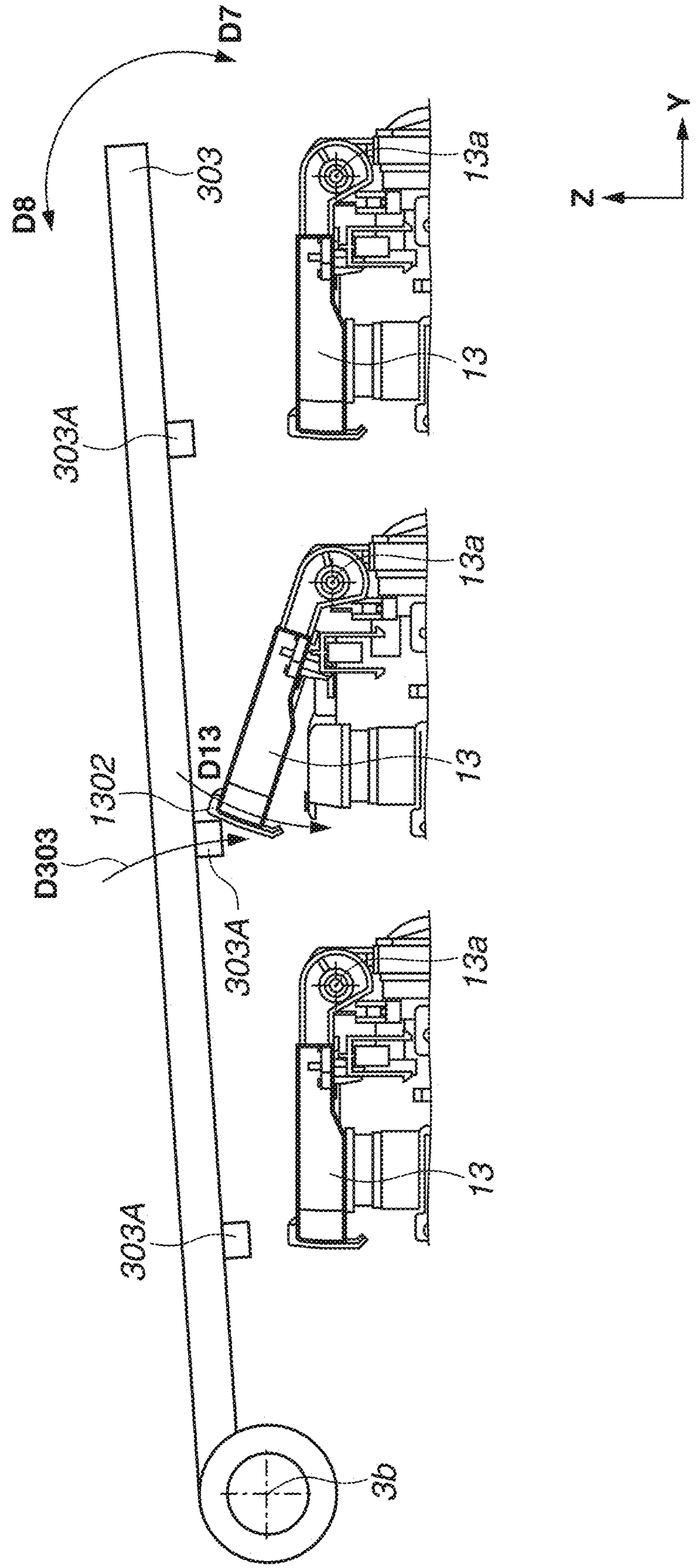
FIG. 21 is a diagram illustrating a structure of a tank access cover and a tank cover portion according to a second exemplary embodiment.

FIG. 21 is a view illustrating a structure of the tank access cover 303 and the tank cover portion 13 of the liquid discharge apparatus 1 according to the present exemplary embodiment. The swing centers 3*b* and 13*a* of the tank access cover 303 and the tank cover portion 13 of the liquid discharge apparatus 1 according to the present exemplary embodiment are both parallel to the X-direction. The tank cover portion 13 swings in the direction D4 or D5 on the swing center 13*a* as a center as in the first exemplary embodiment. The tank access cover 303 swings in a direction D7 or D8 on the swing center 3*b* as a center. Further, the tank access cover 303 is provide with the rib 303A.

FIG. 21 illustrates how the tank access cover 303 is moved to the close position in a state where the engagement portion 130 of the tank cover portion 13 is not engaged with the engagement portion 20 and the tank cover portion 13 is not at the close position. In a state where the engagement portion 130 of the tank cover portion 13 is not engaged with the engagement portion 20, the tank cover portion 13 is in a state of being lifted by the urging member 18. In this state, the tank access cover 303 is moved from the open position in the closing direction (direction D7), and the rib 303A and the distal end portion 1302 of the tank cover portion 13 come into contact with each other. Since the movement locus D303 of the rib 303A and the movement locus D13 of the tank cover portion 13 intersect, the rib 303A and the tank cover portion 13 block operations of each other.

In this state, moving the tank access cover 303 further in the direction D7 causes the tank cover portion 13 and the tank access cover 303 to prop against each other. Thus, in a state where the tank cover portion 13 is lifted by the urging member 18, the tank access cover 303 cannot be moved to the close position, and the cover detection sensor 35*a* detects the tank access cover 303 being not at the close position.

The tank access cover 303 according to either the first or second exemplary embodiment can share functions with the access cover 302 for performing maintenance operations on the inside of the liquid discharge apparatus 1. Further, while both the tank access cover 303 and the tank cover portion 13 move by swinging in the examples according to the exemplary embodiments, the tank access cover 303 and the tank cover portion 13 can move between the open position and the close position by parallel movement. Further, while the valve 16 opens and closes both of the passages 14*a* and 15*a* in the above-described examples, the valve 16 can be configured to open and close only one of the passages 14*a* and 15*a*.

With the present disclosure, an opening operation of a valve is performed appropriately without causing inconvenience to users.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-192447, filed Nov. 26, 2021, which is hereby incorporated by reference herein in its entirety.

What is claimed is:

1. A liquid discharge apparatus comprising:

a container including an injection portion through which a liquid is to be injected, wherein the container is configured to store the liquid to be supplied to a liquid discharge head configured to discharge the liquid;

a passage through which the liquid is to be supplied from the container to the liquid discharge head;

a first cover portion configured to pivot on a first axis as a center between an open position of the first cover portion to allow access to the injection portion and a close position of the first cover portion not to allow access to the injection portion;

a second cover portion configured to pivot on a second axis intersecting the first axis as a center between an open position of the second cover portion to expose the first cover portion and a close position of the second cover portion to cover the first cover portion; and a valve unit configured to switch to an open state to open the passage in a case where the second cover portion pivots from the open position to the close position.

2. The liquid discharge apparatus according to claim 1, further comprising a switch member configured to switch the valve unit to the open state by coming into contact with the second cover portion moving to the second cover portion close position and moving the second cover portion in a first direction.

3. The liquid discharge apparatus according to claim 2, wherein the second cover portion includes a projection portion that comes into contact with the switch member as the second cover portion moves from the second cover portion open position to the second cover portion close position.

4. The liquid discharge apparatus according to claim 3, wherein the second cover portion includes a hold portion configured to be held by a user, and a distance between the projection portion and the second axis is shorter than a distance between the hold portion and the second axis.

5. The liquid discharge apparatus according to claim 1, wherein the valve unit switches to a close state in a case where the first cover portion pivots from the first cover portion close position to the first cover portion open position.

6. The liquid discharge apparatus according to claim 1, wherein, in a case where the first cover portion is not at the first cover portion close position, the first cover portion blocks pivoting of the second cover portion from the second cover portion open position to the second cover portion close position.

7. The liquid discharge apparatus according to claim 1, wherein a direction of the first axis and a direction of the second axis are perpendicular to each other.

8. The liquid discharge apparatus according to claim 1, wherein the container includes a first container and a second container, and the first container and the second container are aligned in a direction of the second axis.

9. The liquid discharge apparatus according to claim 1, wherein the valve unit includes a displacement member disposed in a radial direction of the passage and configured to be displaced freely and a cam member having a cam surface configured to come into contact with the displacement member, wherein the cam member rotates in a second direction along with a movement of the first cover portion to the first cover portion open position, wherein the cam member rotates in a third direction opposite to the second direction along with a movement of the second cover portion to the second cover portion close position, and wherein the cam surface pushes the displacement member to close the passage in the radial direction as the cam member rotates in the second direction.

10. The liquid discharge apparatus according to claim 1, wherein the first cover portion includes a first engagement portion configured to be engaged with a second engagement portion of the liquid discharge apparatus at the first cover portion close position, and engagement maintains the first cover portion at the first cover portion close position.

11. The liquid discharge apparatus according to claim 1, further comprising an urging member configured to urge the first cover portion toward the first cover portion open position.

12. The liquid discharge apparatus according to claim 1, wherein the second cover portion includes a rib portion that comes into contact with a distal end portion of the first cover portion in a state of being not at the second cover portion close position and blocks pivoting of the first cover portion to the first cover portion close position.

13. The liquid discharge apparatus according to claim 12, wherein the contact of the rib portion with the distal end portion of the first cover portion blocks pivoting of the second cover portion to the second cover portion close position.

14. The liquid discharge apparatus according to claim 1, further comprising:

a detection unit configured to detect a position of the second cover portion; and a control unit configured to control performance of discharging of the liquid by the liquid discharge head based on a result of detection by the detection unit.

15. The liquid discharge apparatus according to claim 1, wherein the container includes a first container and a second container, and the first cover portion is provided to each of the first container and the second container whereas the second cover portion is provided as a single common second cover portion for the first container and the second container.

16. The liquid discharge apparatus according to claim 1, further comprising a cap portion configured to block the injection portion, wherein the cap portion includes a groove configured to hold a sealing liquid.

17. The liquid discharge apparatus according to claim 1, wherein the liquid discharge apparatus is a recording apparatus configured to record on a recording medium by discharging ink from the liquid discharge head to the recording medium.

18. The liquid discharge apparatus according to claim 17, wherein the recording medium is a medium in a form of a roll, a sheet, or both a roll and a sheet.

* * * * *